United States Patent
Oh et al.

(10) Patent No.: US 9,308,917 B2
(45) Date of Patent: Apr. 12, 2016

(54) DRIVER ASSISTANCE APPARATUS CAPABLE OF PERFORMING DISTANCE DETECTION AND VEHICLE INCLUDING THE SAME

(71) Applicant: LG ELECTRONICS INC., Seoul (KR)

(72) Inventors: Sangguel Oh, Seoul (KR); Ikkyu Kim, Seoul (KR)

(73) Assignee: LG ELCTRONICS INC., Seoul (KR)

( * ) Notice: Subject to any disclaimer, the term of this patent is extended or adjusted under 35 U.S.C. 154(b) by 0 days.

(21) Appl. No.: 14/671,190

(22) Filed: Mar. 27, 2015

(65) Prior Publication Data

US 2015/0344032 A1     Dec. 3, 2015

(30) Foreign Application Priority Data

May 28, 2014 (KR) .......................... 10-2014-0064156

(51) Int. Cl.
*B60W 30/16* (2012.01)
*H04N 13/02* (2006.01)
*G06T 5/50* (2006.01)
(Continued)

(52) U.S. Cl.
CPC ............. *B60W 30/16* (2013.01); *B60G 17/018* (2013.01); *B60T 7/22* (2013.01); *B62D 6/00* (2013.01); *G06K 9/00805* (2013.01); *G06T 5/50* (2013.01); *G06T 7/002* (2013.01); *G06T 7/0044* (2013.01); *G06T 7/2086* (2013.01); *G06T 15/10* (2013.01); *H04N 13/021* (2013.01); *H04N 13/0203* (2013.01); *H04N 13/0239* (2013.01); *B60W 2420/42* (2013.01); *B60W 2550/308* (2013.01); *G06T 2207/10012* (2013.01);
(Continued)

(58) Field of Classification Search
USPC .......................................................... 701/37
See application file for complete search history.

(56) References Cited

U.S. PATENT DOCUMENTS 7,630,806 B2 * 12/2009 Breed ................. B60R 21/0134
180/273
7,782,179 B2 *  8/2010 Machii ................... G01S 11/12
340/435

(Continued)

FOREIGN PATENT DOCUMENTS

EP          1 637 836        3/2006
JP       10-341458 A        12/1998
(Continued)

OTHER PUBLICATIONS

Korean Office Action issued in Application No. 10-2014-0064156 dated Apr. 13, 2015.

(Continued)

*Primary Examiner* — Thomas Tarcza
*Assistant Examiner* — Alex C Dunn
(74) *Attorney, Agent, or Firm* — Ked & Associates, LLP

(57) ABSTRACT

A driver assistance apparatus and a vehicle including the same are disclosed. The driver assistance apparatus includes a stereo camera and a processor to perform a calibration based on first regions that include objects for vehicle structures or external to the vehicle in stereo images acquired by the stereo camera in a calibration mode and to detect a distance to an object ahead of the vehicle based on second regions not including the objects for the vehicle structures in the stereo images acquired by the stereo camera in a normal mode. Consequently, it is possible to accurately perform distance detection based on images photographed by the stereo camera.

19 Claims, 30 Drawing Sheets

(51) Int. Cl.
- *G06T 7/20* (2006.01)
- *G06T 7/00* (2006.01)
- *G06T 15/10* (2011.01)
- *B62D 6/00* (2006.01)
- *B60T 7/22* (2006.01)
- *B60G 17/018* (2006.01)
- *G06K 9/00* (2006.01)
- *H04N 13/00* (2006.01)

(52) U.S. Cl.
CPC .............. *G06T 2207/30241* (2013.01); *H04N 2013/0081* (2013.01); *H04N 2013/0085* (2013.01)

(56) References Cited

U.S. PATENT DOCUMENTS

| | | | | |
|---|---|---|---|---|
| 8,606,480 B2 * | 12/2013 | Watanabe | ............... | G06T 7/204 382/106 |
| 2005/0015203 A1 * | 1/2005 | Nishira | ................. | G08G 1/167 701/301 |
| 2008/0046150 A1 * | 2/2008 | Breed | ................. | B60R 21/0134 701/45 |
| 2012/0083960 A1 * | 4/2012 | Zhu | ...................... | G05D 1/0214 701/23 |
| 2013/0073194 A1 * | 3/2013 | Nakamura | ......... | G06K 9/00798 701/301 |

FOREIGN PATENT DOCUMENTS

| | | |
|---|---|---|
| JP | 2007-533541 A | 11/2007 |
| JP | 2013-129264 A | 7/2013 |
| KR | 10-2012-0077309 | 7/2012 |
| WO | WO 2005-102765 A1 | 11/2005 |

OTHER PUBLICATIONS

European Search Report dated Nov. 4, 2015.
Scott Doualas. "Stereo-Vision Framework for Autonomous Vehicle Guidance and Collision Avoidance"; Otec Ltd., The Western Centre, Western Road, Bracknell, RG12 1 RW, U.K.; Image and Signal Processing Group, University of the Witwatersrand, South Africa; International Society-for Optical Engineering; vol. 5084, Apr. 24, 2003; pp. 100-108; XP008046761.

* cited by examiner (a)

(b)

(a)

(b)

(a)

(b)

(a)

(b)

DRIVER ASSISTANCE APPARATUS CAPABLE OF PERFORMING DISTANCE DETECTION AND VEHICLE INCLUDING THE SAME

CROSS-REFERENCE TO RELATED APPLICATION

This application claims priority under 35 U.S.C. §119 to Korean Patent Application No. 10-2014-0064156, filed on May 28, 2014, whose entire disclosure is hereby incorporated by reference.

BACKGROUND OF THE INVENTION

1. Field

The present invention relates to a driver assistance apparatus and a vehicle including the same and, more particularly, to a driver assistance apparatus that is capable of accurately performing distance detection based on an image photographed by a stereo camera and a vehicle including the same.

2. Background

A vehicle is a device that allows a driver to move in a desired direction. A representative example of the vehicle may be a car.

In order to improve the convenience of a user who uses the vehicle, the vehicle has been equipped with various sensors and electronic devices. In particular, various devices to improve driving convenience of the user have been developed.

SUMMARY OF THE INVENTION

It is an object of the present disclosure to provide a driver assistance apparatus that is capable of accurately performing distance detection based on an image photographed by a stereo camera and a vehicle including the same.

In accordance with an aspect of the present disclosure, the above and other objects can be accomplished by the provision of a driver assistance apparatus including a stereo camera and a processor to perform calibration based on first regions including objects for vehicle structures in stereo images acquired by the stereo camera in a calibration mode and to detect a distance to an object ahead of the vehicle based on second regions not including the objects for the vehicle structures in the stereo images acquired by the stereo camera in a normal mode.

In accordance with another aspect of the present disclosure, there is provided a driver assistance apparatus including a stereo camera and a processor to perform calibration based on first regions including objects for structures outside a vehicle in stereo images acquired by the stereo camera in a calibration mode and to detect a distance to an object ahead of the vehicle based on second regions not including the objects for the structures external to the vehicle in the stereo images acquired by the stereo camera in a normal mode.

In accordance with another aspect of the present disclosure, there is provided a vehicle including a steering drive unit to drive a steering apparatus, a brake drive unit to drive a brake apparatus, a power source drive unit to drive a power source, a suspension drive unit to drive a suspension apparatus, a stereo camera, a processor to perform calibration based on first regions including objects for vehicle structures in stereo images acquired by the stereo camera in a calibration mode and to detect a distance to an object ahead of the vehicle based on second regions not including the objects for the vehicle structures in the stereo images acquired by the stereo camera in a normal mode, and a controller to generate a control signal to control at least one of the steering drive unit, the brake drive unit, the power source drive unit, and the suspension drive unit based on the detected distance to the object ahead of the vehicle.

In accordance with a further aspect of the present disclosure, there is provided a vehicle including a steering drive unit to drive a steering apparatus, a brake drive unit to drive a brake apparatus, a power source drive unit to drive a power source, a suspension drive unit to drive a suspension apparatus, a stereo camera, a processor to perform calibration based on first regions including objects for structures external to a vehicle in stereo images acquired by the stereo camera in a calibration mode and to detect a distance to an object ahead of the vehicle based on second regions not including the objects for the structures external to the vehicle in the stereo images acquired by the stereo camera in a normal mode, and a controller to generate a control signal to control at least one of the steering drive unit, the brake drive unit, the power source drive unit, and the suspension drive unit based on the detected distance to the object ahead of the vehicle.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Exemplary embodiments of the present disclosure will be described with reference to the attached drawings.

The terms "module" and "unit," when attached to the names of components are used herein to help the understanding of the components and thus they should not be considered as having specific meanings or roles. Accordingly, the terms "module" and "unit" may be used interchangeably.

A vehicle as described in this specification may include a car and a motorcycle. Hereinafter, a description will be given based on a car.

On the other hand, a vehicle as described in this specification may include a vehicle having an engine, a hybrid vehicle having an engine and an electric motor, an electric vehicle having an electric motor, and the like. Hereinafter, a description will be given based on a vehicle having an engine.

A driver assistance apparatus as described in this specification may be an advanced driver assistance system (ADAS) or an advanced driver assistance apparatus (ADAA). Hereinafter, a description will be given of various embodiments of a driver assistance apparatus according to the present disclosure and a vehicle including the same.

Figure 1:
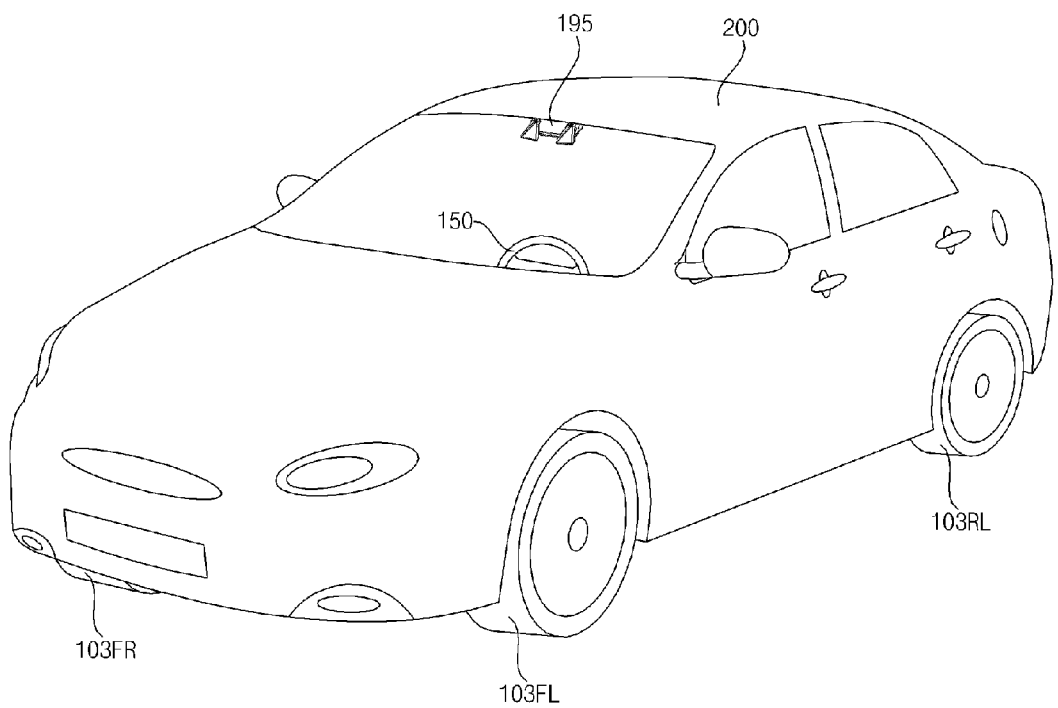
FIG. 1 is a view showing the external appearance of a vehicle having a stereo camera according to an embodiment of the present disclosure.

FIG. 1 is a view showing the external appearance of a vehicle having a stereo camera according to an embodiment of the present disclosure.

Referring to FIG. 1, a vehicle 200 may include a wheels 103FR, 103FL, 103RL, and the like, a steering wheel 150, and a stereo camera 195 provided in the vehicle 200.

The stereo camera 195 may include a plurality of cameras. Stereo images acquired by the cameras may be signal-processed in a driver assistance apparatus 100 (see FIG. 3).

Meanwhile, FIG. 1 shows, by way of example, that the stereo camera 195 may include two cameras.

Figure 2:
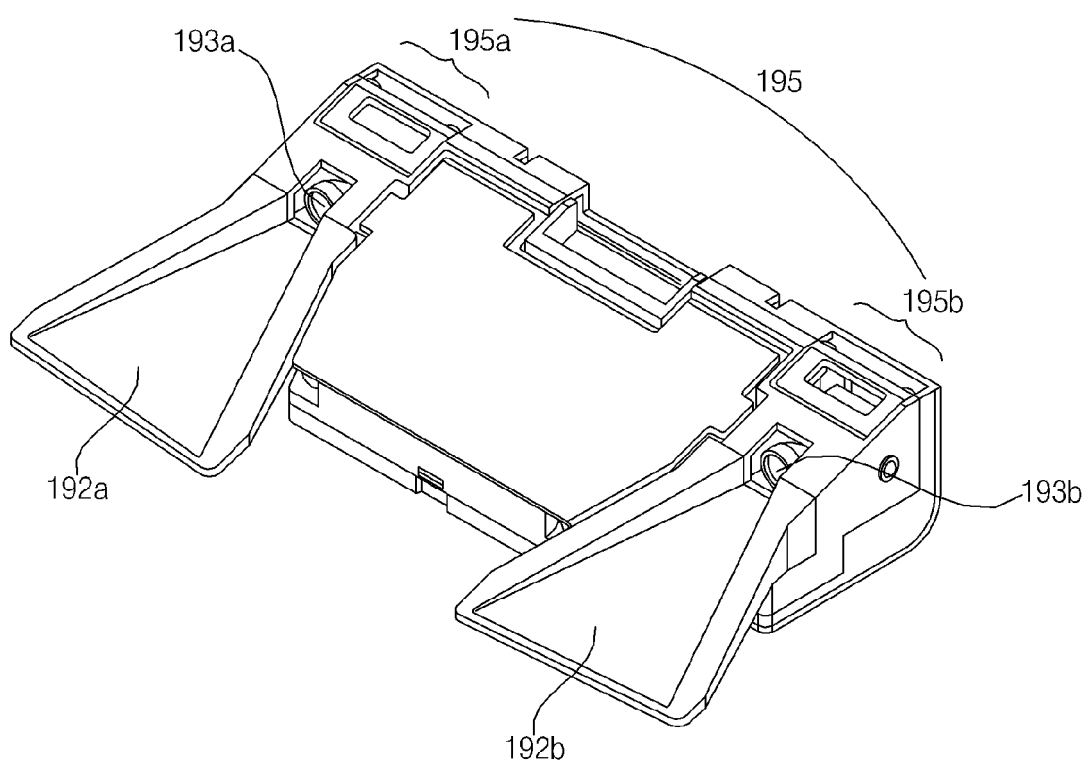
FIG. 2 is a view showing the external appearance of the stereo camera attached to the vehicle shown in FIG. 1.

FIG. 2 is a view showing the external appearance of the stereo camera attached to the vehicle shown in FIG. 1.

Referring to FIG. 2, the stereo camera 195 may include a first camera 195a having a first lens 193a and a second camera 195b having a second lens 193b.

In addition, the stereo camera 195 may further include a first light shield unit 192a to shield light falling incident upon the first lens 193a and a second light shield unit 192b to shield light falling incident upon the second lens 193b.

The stereo camera 195 shown in FIG. 2 may be detachably attached to a ceiling or a front windshield glass of the vehicle 200.

The driver assistance apparatus 100 (see FIG. 3) having the stereo camera 195 may acquire stereo images for a view ahead of the vehicle from the stereo camera 195, detect a disparity based on the stereo images, detect an object for at least one of the stereo images based on disparity information, and continuously track motion of the object after detection of the object.

Figure 3A:
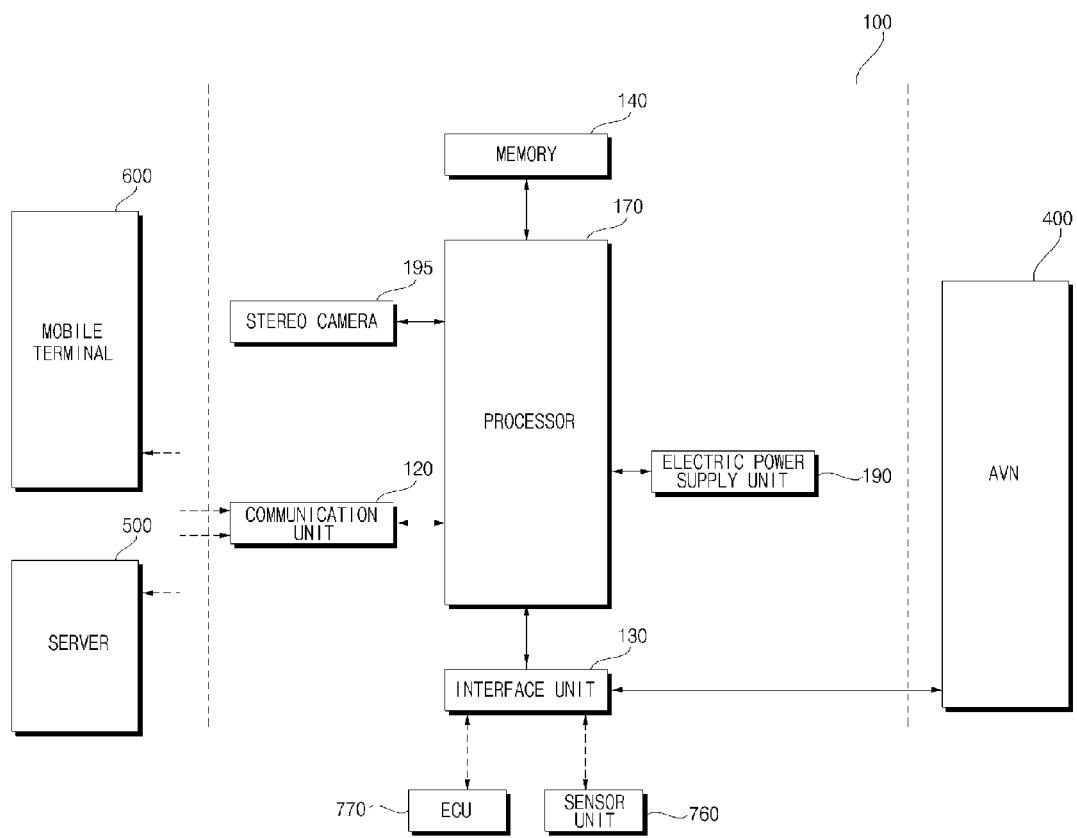
FIGS. 3A and 3B are internal block diagrams showing various examples of a driver assistance apparatus according to an embodiment of the present disclosure.
Figure 3B:
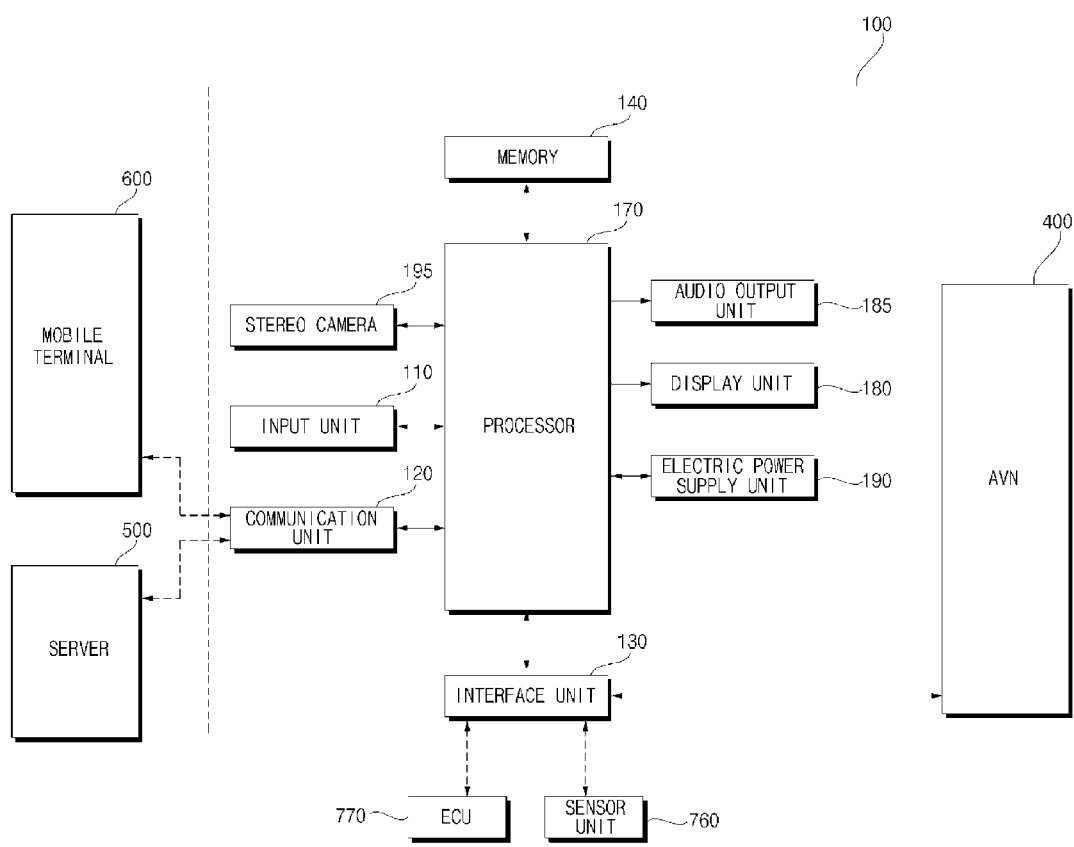

FIGS. 3A and 3B are internal block diagrams showing various examples of a driver assistance apparatus according to an embodiment of the present disclosure.

Referring to FIGS. 3A and 3B, the driver assistance apparatus 100 may signal-process stereo images received from the stereo camera 195 based on computer vision to generate vehicle-related information. Computer vision includes methods for acquiring, processing, analyzing, and understanding images and, in general, high-dimensional data from the real world in order to produce numerical or symbolic information, e.g., in the forms of decisions to duplicate the abilities of human vision by electronically perceiving and understanding an image. This image understanding can be seen as the disentangling of symbolic information from image data using models constructed with the aid of geometry, physics, statistics, and learning theory. The image data can take many forms, such as video sequences, views from multiple cameras, or multi-dimensional data. The vehicle-related information may include vehicle control information for direct control of the vehicle or driver assistance information for driving guidance provided to a driver.

Referring first to FIG. 3A, the driver assistance apparatus 100 may include a communication unit 120, an interface unit 130, a memory 140, a processor 170, an electric power supply unit 190, and a stereo camera 195.

The communication unit 120 may exchange data with a mobile terminal 600 or a server 500 in a wireless fashion. In particular, the communication unit 120 may exchange data with a mobile terminal of the driver in a wireless fashion. To this end, various wireless data communication protocols, such as Bluetooth, Wi-Fi, Wi-Fi Direct, and APiX, may be used.

The communication unit 120 may receive weather information and road traffic state information, such as Transport Protocol Expert Group (TPEG) information, from the mobile terminal 600 or the server 500. On the other hand, the communication unit 120 may transmit real-time traffic information acquired by the driver assistance apparatus 100 based on stereo images to the mobile terminal 600 or the server 500.

When a user gets into the vehicle, a mobile terminal 600 of the user may pair with the driver assistance apparatus 100 automatically or by the user executing a pairing application.

The interface unit 130 may receive vehicle-related data or transmit a signal processed or generated by the processor 170 to the outside. To this end, the interface unit 130 may perform data communication with an electronic control unit (ECU) 770, an audio and video navigation (AVN) apparatus 400, and a sensor unit 760 in the vehicle in a wired communication fashion or a wireless communication fashion.

The interface unit 130 may receive map information related to vehicle travel through data communication with the AVN apparatus 400.

On the other hand, the interface unit 130 may receive sensor information from the ECU 770 and the sensor unit 760.

The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, or in-vehicle humidity information.

The sensor information may be acquired by a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, or an in-vehicle humidity sensor. The position module may include a global positioning system (GPS) module to receive GPS information.

Of the above-specified sensor information, the vehicle heading information, the vehicle position information, the vehicle angle information, the vehicle speed information, and the vehicle tilt information, which are related to vehicle travel, may be referred to as vehicle travel information.

The memory 140 may store various data related to overall operation of the driver assistance apparatus 100, such as programs for processing or control of the processor 170.

An audio output interface (not shown) may convert an electric signal received from the processor 170 into an audio signal and outputs the audio signal. To this end, the audio interface unit (not shown) may include a speaker. The audio interface unit (not shown) may output a sound corresponding to an operation of an input unit (not shown), e.g. a user control.

An audio input unit (not shown) may receive a user's voice. To this end, the audio input unit (not shown) may include a microphone. The received voice may be converted into an electric signal, which may be transmitted to the processor 170.

The processor 170 controls overall operation of each unit in the driver assistance apparatus 100.

In particular, the processor 170 performs signal processing based on computer vision. Consequently, the processor 170 may acquire stereo images for the view ahead of the vehicle from the stereo camera 195, calculate the disparity for the view ahead of the vehicle based on the stereo images, detect an object for at least one of the stereo images based on calculated disparity information, and continuously track motion of the object after detection of the object.

In particular, during detection of the object, the processor 170 may perform lane marker detection, adjacent vehicle detection, pedestrian detection, traffic sign detection, and road surface detection.

In addition, the processor 170 may calculate the distance to the detected adjacent vehicle, speed of the detected adjacent vehicle, and a difference in speed with the detected adjacent vehicle.

Meanwhile, the processor 170 may receive weather information and road traffic state information, such as TPEG information, through the communication unit 120.

On the other hand, the processor 170 may acquire, in real time, traffic-around-vehicle state information acquired by the driver assistance apparatus 100 based on stereo images.

Meanwhile, the processor 170 may receive map information from the AVN apparatus 400 through the interface unit 130.

On the other hand, the processor 170 may receive sensor information from the ECU 770 or the sensor unit 760 through the interface unit 130. The sensor information may include at least one of vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, and in-vehicle humidity information.

The electric power supply unit 190 may supply electric power to the respective components under control of the processor 170. In particular, electric power from an in-vehicle battery may be supplied to the electric power supply unit 190.

The stereo camera 195 may include a plurality of cameras. In the following description, it is assumed that the stereo camera 195 includes two cameras as previously described with reference to FIG. 2.

The stereo camera 195 may be detachably attached to a ceiling or a front windshield glass of the vehicle 200. The stereo camera 195 may include a first camera 195*a* having a first lens 193*a* and a second camera 195*b* having a second lens 193*b*.

In addition, the stereo camera 195 may further include a first light shield unit 192*a* to shield light incident upon the first lens 193*a* and a second light shield unit 192*b* to shield light incident upon the second lens 193*b*.

Referring now to FIG. 3B, the driver assistance apparatus 100 of FIG. 3B may further include an input unit 110, a display unit 180, and an audio output unit 185 as compared with the driver assistance apparatus 100 of FIG. 3A. Hereinafter, a description will be given only for the input unit 110, the display unit 180, and the audio output unit 185.

The user input unit 110 may include a plurality of user controls or a touchscreen attached to the driver assistance apparatus 100, specifically to the stereo camera 195. The driver assistance apparatus 100 may be powered on through the user controls or the touchscreen such that the driver assistance apparatus 100 is operated. In addition, various input operations may be performed through the input unit 110.

The display unit 180 may display an image related to an operation of the driver assistance apparatus. In order to display such an image, the display unit 180 may include a cluster or a heads up display (HUD) provided at the inside front of the vehicle. In a case in which the display unit 180 is the HUD, the display unit 180 may include a projection module to project an image on the front windshield glass of the vehicle 200.

The audio output unit 185 outputs a sound based on an audio signal processed by the processor 170 to the outside. To this end, the audio output unit 185 may include at least one speaker.

Figure 4A:
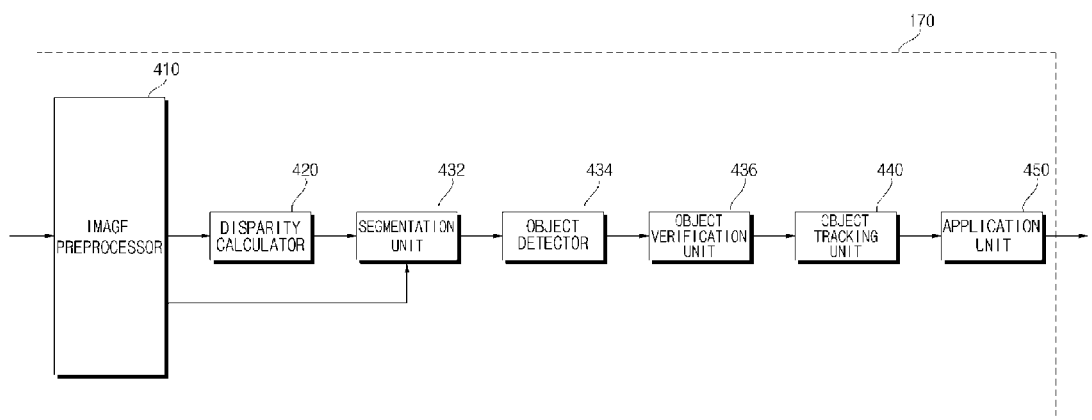
FIGS. 4A and 4B are internal block diagrams showing various examples of a processor shown in FIGS. 3A and 3B.
Figure 4B:
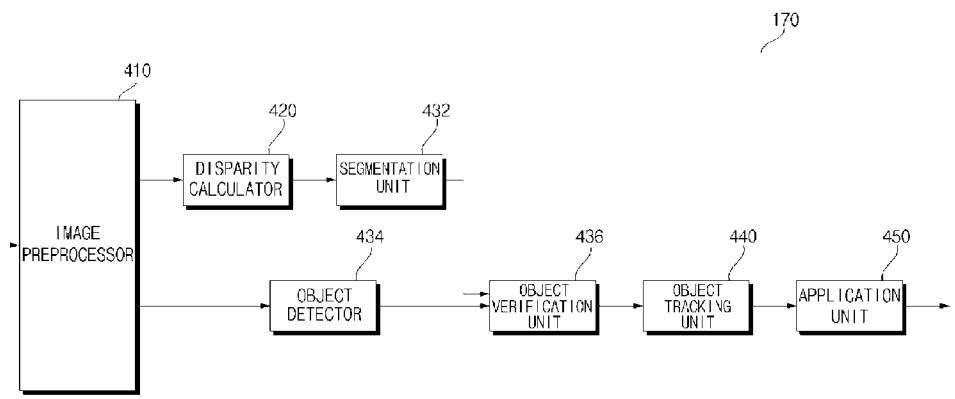

FIGS. 4A and 4B are internal block diagrams showing various examples of the processor shown in FIGS. 3A and 3B and FIGS. 5A and 5B are reference views illustrating operations of the processors shown in FIGS. 4A and 4B.

Referring first to FIG. 4A, which is an internal block diagram showing an example of the processor 170, the processor 170 of the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 receives stereo images from the stereo camera 195 and preprocesses the received stereo images.

Specifically, the image preprocessor 410 may perform noise reduction, rectification, calibration, color enhancement, color space conversion (CSC), interpolation, and camera gain control for the stereo images. As a result, the image preprocessor 410 may acquire stereo images more vivid than the stereo images photographed by the stereo camera 195.

The disparity calculator 420 may receive the stereo images signal-processed by the image preprocessor 410, perform stereo matching for the received stereo images, and acquire a disparity map based on the stereo matching. That is, the disparity calculator 420 may acquire disparity information of stereo images for a view ahead of the vehicle.

The stereo matching may be performed on a per pixel basis or a per predetermined block basis of the stereo images. Meanwhile, the disparity information may be included in a map showing binocular parallax information as values.

The segmentation unit 432 may perform segmentation and clustering for at least one of the stereo images based on the disparity information from the disparity calculator 420.

Specifically, the segmentation unit 432 may segment at least one of the stereo images into a background and a foreground based on the disparity information.

For example, a region having a predetermined value or less of the disparity information in the disparity map may be calculated as a background and the region may be excluded. As a result, a foreground may be relatively separated from the stereo image.

In another example, a region having a predetermined value or more of the disparity information in the disparity map may be calculated as a foreground and the region may be extracted. As a result, the foreground may be separated from the stereo image.

As described above, the stereo image is segmented into the background and the foreground based on the disparity information extracted based on the stereo image. Therefore, signal processing speed and signal processing amount may be reduced during detection of an object.

The object detector 434 may detect an object based on the image segment from the segmentation unit 432. That is, the object detector 434 may detect an object for at least one of the stereo images based on the disparity information. For example, the object detector 434 may detect an object from a foreground separated from the stereo image by the image segment. Subsequently, the object verification unit 436 classifies and verifies the separated object.

To this end, the object verification unit 436 may use a recognition method using a neural network, a support vector machine (SVM) method, a recognition method based on AdaBoost using a Haar-like feature, a histograms of oriented gradients (HOG) method, or another appropriate technique.

On the other hand, the object verification unit 436 may compare the detected object with objects stored in the memory 140 to verify the detected object.

For example, the object verification unit 436 may verify an adjacent vehicle, a lane marker, a road surface, a traffic sign, a dangerous zone, a tunnel, and the like located around the vehicle.

The object tracking unit 440 tracks the verified object. For example, the object tracking unit 440 may verify an object in stereo images which are sequentially acquired, calculate motion or a motion vector of the verified object, and track movement of the object based on the calculated motion or the calculated motion vector. Consequently, the object tracking unit 440 may track an adjacent vehicle, a lane marker, a road surface, a traffic sign, a dangerous zone, a tunnel, and the like located around the vehicle.

Subsequently, the application unit 450 may calculate a risk of the vehicle 200 based on various objects, such as adjacent vehicle, a lane marker, a road surface, and a traffic sign, located around the vehicle. In addition, the application unit 450 may calculate a possibility of a rear-end collision with a preceding vehicle, slip of the vehicle, and the like.

In addition, the application unit 450 may output a message informing a user of the following information as driver assistance information based on the calculated risk, the calculated possibility of the rear-end collision, or the calculated slip of the vehicle. Alternatively, the application unit 450 may generate a control signal for attitude control or travel control of the vehicle 200 as vehicle control information.

FIG. 4B is an internal block diagram showing another example of the processor 170.

Referring to FIG. 4B, the processor 170 of FIG. 4B is substantially similar in construction to the processor 170 of FIG. 4A except that a signal processing sequence of the processor 170 of FIG. 4B is different from that of the processor 170 of FIG. 4A. Hereinafter, a description will be given of only the difference between the processor 170 of FIG. 4B and the processor 170 of FIG. 4A.

The object detector 434 may receive stereo images and detect an object for at least one of the stereo images. Unlike FIG. 4A, the object detector 434 may not detect an object for an image segmented based on disparity information but directly detect an object from a stereo image.

Subsequently, the object verification unit 436 may classify and verify the detected and separated object based on the image segment from the segmentation unit 432 and the object detected by the object detector 434.

To this end, the object verification unit 436 may use a recognition method using a neural network, an SVM method, a recognition method based on AdaBoost using a Haar-like feature, or a HOG method.

Figure 5A:
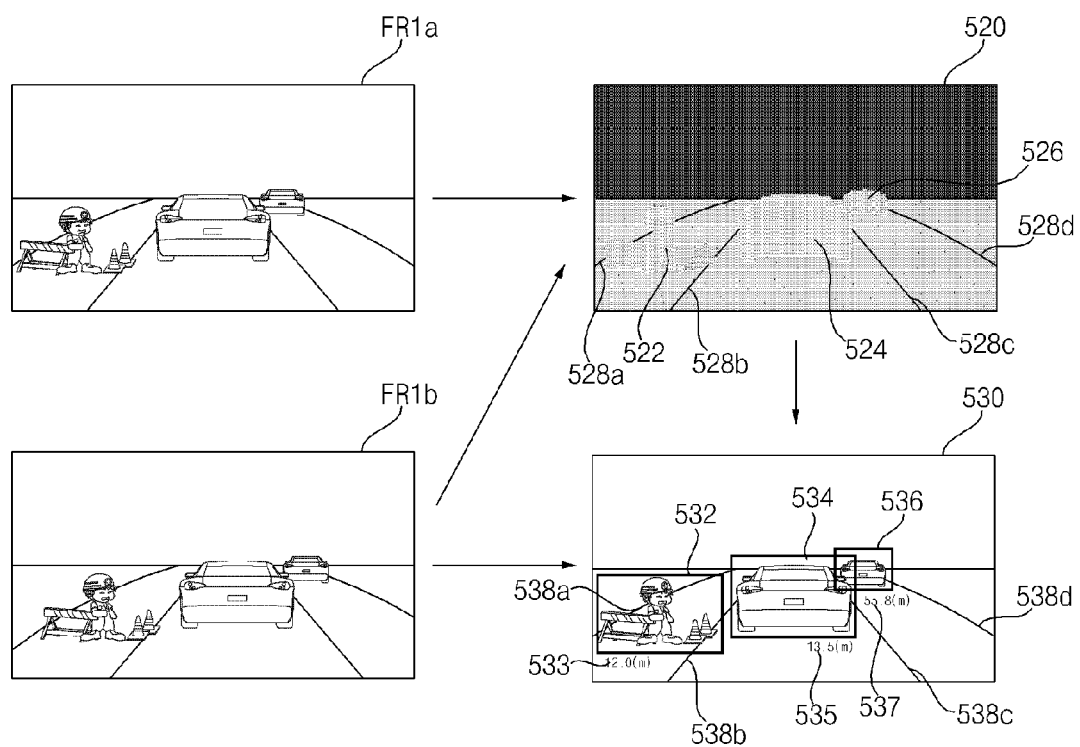
FIGS. 5A and 5B are reference views illustrating operations of the processors shown in FIGS. 4A and 4B.
Figure 5B:
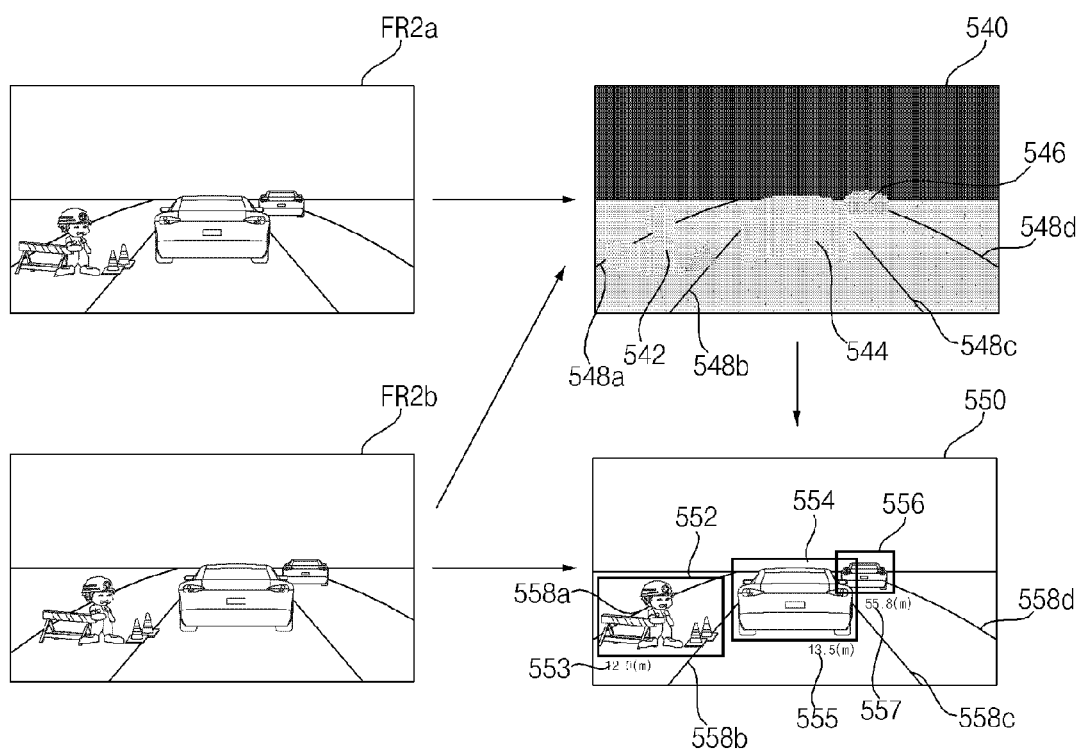

FIGS. 5A and 5B are reference views illustrating an operation of the processor 170 shown in FIG. 4A based on stereo images acquired from first and second frame periods.

Referring first to FIG. 5A, the stereo camera 195 acquires stereo images during the first frame period.

The disparity calculator 420 of the processor 170 receives stereo images FR1a and FR1b signal-processed by the image preprocessor 410 and performs stereo matching for the received stereo images FR1a and FR1b to acquire a disparity map 520.

The disparity map 520 shows a disparity between the stereo images FR1a and FR1b as levels. When a disparity level is high, the distance to the vehicle may be calculated as being short. When a disparity level is low, on the other hand, the distance to the vehicle may be calculated as being long.

Meanwhile, in a case in which the disparity map is displayed, the disparity map may be displayed with higher brightness when the disparity level is higher and the disparity map may be displayed with lower brightness when the disparity level is lower.

By way of example, FIG. 5A shows that in the disparity map 520, first to fourth lane markers 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a and FR1b based on the disparity map 520. The object detection and object verification for the second stereo image FR1b are performed using the disparity map 520. That is, object detection and object verification for first to fourth lane markers 538a, 538b, 538c, and 538d, a construction zone 532, a first preceding vehicle 534, and a second preceding vehicle 536 in an image 530 may be performed.

Referring now to FIG. 5B, the stereo camera 195 acquires stereo images during the second frame period. The disparity calculator 420 of the processor 170 receives stereo images FR2a and FR2b signal-processed by the image preprocessor 410 and performs stereo matching for the received stereo images FR2a and FR2b to acquire a disparity map 540. In the disparity map 540, first to fourth lane markers 548a, 548b, 548c, and 548d have their own disparity levels and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540. The object detection and object verification for the second stereo image FR2b are performed using the disparity map 540. That is, object detection and object verification for first to fourth lane markers 558a, 558b, 558c, and 558d, a construction zone 552, a first preceding vehicle 554, and a second preceding vehicle 556 in an image 550 may be performed.

Meanwhile, the object tracking unit 440 may track the objects verified based on comparison between FIGS. 5A and 5B.

Specifically, the object tracking unit 440 may track movement of the objects verified in FIGS. 5A and 5B based on motion or motion vectors of the objects. Consequently, the object tracking unit 440 may track the lane markers, the construction zone, the first preceding vehicle, and the second preceding vehicle located around the vehicle.

Figure 6A:
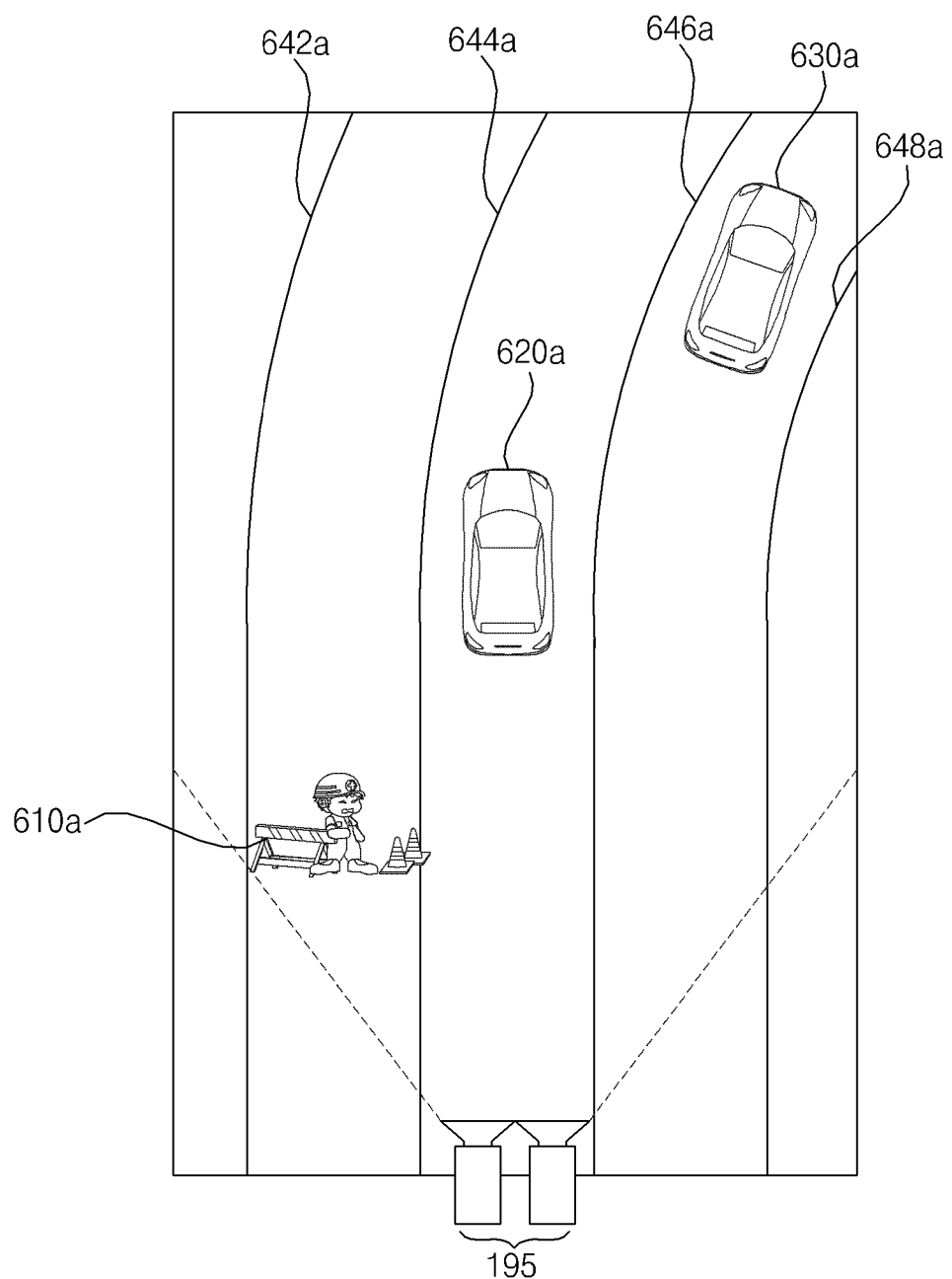
FIGS. 6A and 6B are reference views illustrating operations of the driver assistance apparatuses shown in FIGS. 3A and 3B.
Figure 6B:
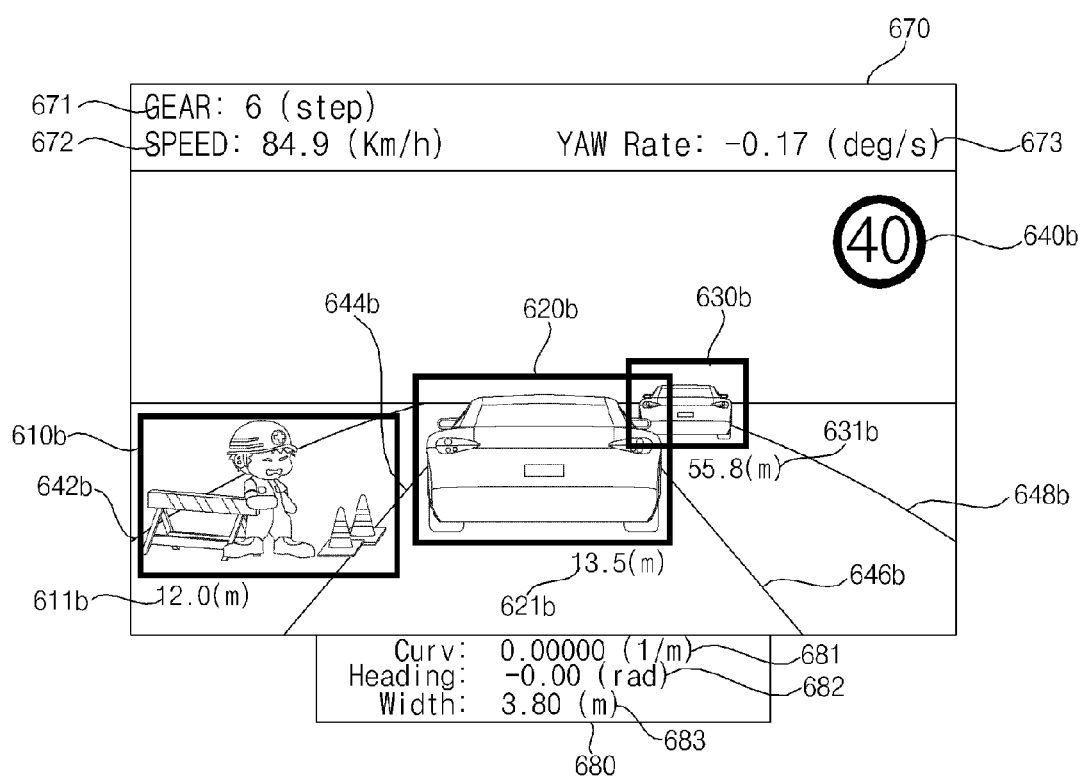

FIGS. 6A and 6B are reference views illustrating an operation of the driver assistance apparatus shown in FIG. 3.

FIG. 6A shows a state ahead of the vehicle photographed by the stereo camera 195 provided in the vehicle. In particular, the state ahead of the vehicle may be displayed as a bird eye view. A first lane marker 642a, a second lane marker 644a, a third lane marker 646a, and a fourth lane marker 648a are arranged from the left side to the right side. A construction zone 610a is located between the first lane marker 642a and the second lane marker 644a. A first preceding vehicle 620a is located between the second lane marker 644a and the third lane marker 646a. A second preceding vehicle 630a is located between the third lane marker 646a and the fourth lane marker 648a.

By way of example, FIG. 6B shows a state ahead of the vehicle acquired by the driver assistance apparatus together with various kinds of information. In particular, an image as shown in FIG. 6B may be displayed on the display unit 180 of the driver assistance apparatus or on the AVN apparatus 400. The information is displayed based on images photographed by the stereo camera 195 unlike FIG. 6A.

Referring to FIG. 6B, a first lane marker 642b, a second lane marker 644b, a third lane marker 646b, and a fourth lane marker 648b are arranged from the left side to the right side. A construction zone 610b is located between the first lane marker 642b and the second lane marker 644b. A first preceding vehicle 620b is located between the second lane marker 644b and the third lane marker 646b. A second preceding vehicle 630b is located between the third lane marker 646b and the fourth lane marker 648b.

The driver assistance apparatus 100 may perform signal processing based on stereo images photographed by the stereo camera 195 to verify objects for the construction zone 610b, the first preceding vehicle 620b, and the second preceding vehicle 630b. In addition, the driver assistance apparatus 100 may verify the first lane marker 642b, the second lane marker 644b, the third lane marker 646b, and the fourth lane marker 648b.

Meanwhile, FIG. 6B shows, by way of example, that, in order to indicate that the objects for the construction zone 610b, the first preceding vehicle 620b, and the second preceding vehicle 630b have been verified, borders of the objects are highlighted.

On the other hand, the driver assistance apparatus 100 may calculate distance information for the construction zone 610b, the first preceding vehicle 620b, and the second preceding vehicle 630b based at least in part on stereo images photographed by the stereo camera 195.

The calculated first distance information 611b, calculated second distance information 621b, and calculated third distance information 631b respectively corresponding to the construction zone 610b, the first preceding vehicle 620b, and the second preceding vehicle 630b are displayed.

Meanwhile, the driver assistance apparatus 100 may receive sensor information for the vehicle from the ECU 770 or the sensor unit 760. In particular, the driver assistance apparatus 100 may receive and display vehicle speed information, gear information, yaw rate information indicating speed at which a rotational angle (yaw angle) of the vehicle is changed, and vehicle angle information.

FIG. 6B shows that vehicle speed information 672, gear information 671, and yaw rate information 673 are displayed at a portion 670 above the image ahead of the vehicle and vehicle angle information 682 is displayed at a portion 680 under the image ahead of the vehicle. However, various examples may be further provided and fall within the scope of the present disclosure. In addition, vehicle width information 683 and road curvature information 681 may be displayed together with the vehicle angle information 682.

On the other hand, the driver assistance apparatus 100 may receive for a road on which the vehicle is traveling through the communication unit 120 or the interface unit 130. FIG. 6B shows that speed limit information 640b may also be displayed.

The driver assistance apparatus 100 may display various kinds of information shown in FIG. 6B through the display unit 180. Alternatively, the driver assistance apparatus 100 may store various kinds of information without additionally displaying the information. In addition, the driver assistance apparatus 100 may utilize the information in various applications.

Figure 7:
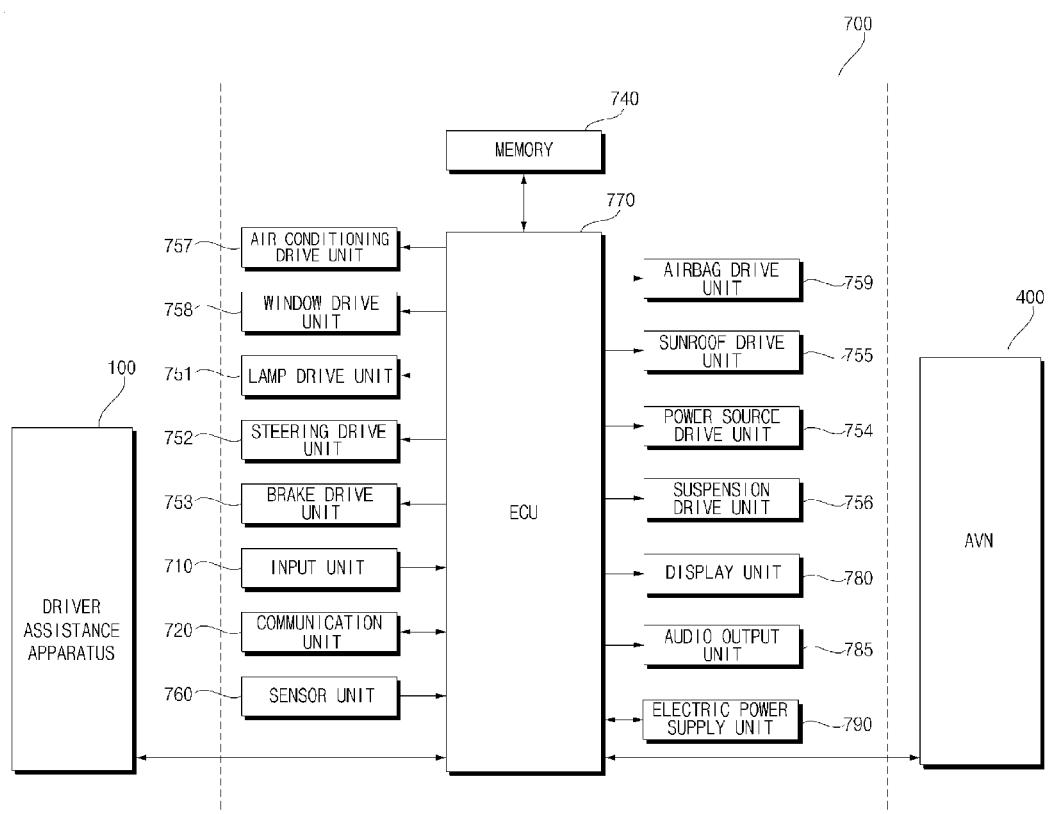
FIG. 7 is an internal block diagram showing an example of an electronic control apparatus in the vehicle shown in FIG. 1.

FIG. 7 is an internal block diagram showing an example of an electronic control apparatus in the vehicle shown in FIG. 1.

Referring to FIG. 7, the vehicle 200 may include an electronic control apparatus 700 for vehicle control. The electronic control apparatus 700 may exchange data with the driver assistance apparatus 100 and the AVN apparatus 400.

The electronic control apparatus 700 may include an input unit 710, a communication unit 720, a memory 740, a lamp drive unit 751, a steering drive unit 752, a brake drive unit 753, a power source drive unit 754, a sunroof drive unit 755, a suspension drive unit 756, an air conditioning drive unit 757, a window drive unit 758, an airbag drive unit 759, a sensor unit 760, an ECU 770, a display unit 780, an audio output unit 785, and an electric power supply unit 790.

The user input unit 710 may include a plurality of user controls or a touchscreen provided in the vehicle 200. Various input operations may be performed through the user controls or the touchscreen.

In one example, the communication unit 720 may exchange data with the mobile terminal 600 or the server 500 in a wireless fashion. In particular, the communication unit 720 may exchange data with a mobile terminal of the driver in a wireless fashion. To this end, various wireless data communication protocols, such as Bluetooth, Wi-Fi, Wi-Fi Direct, and APiX, may be used.

The communication unit 720 may receive weather information and road traffic state information, such as TPEG information, from the mobile terminal 600 or the server 500.

When a user gets into the vehicle, a mobile terminal 600 of the user may pair with the electronic control apparatus 700 automatically or by the user executing an application.

The memory 740 may store various data for overall operation of the electronic control apparatus 700, such as programs for processing or control of the ECU 770.

The lamp drive unit 751 may control turn on/turn off of lamps provided inside and outside the vehicle. In addition, the lamp drive unit 751 may control intensity, direction, and the like of light emitted from each lamp. For example, the lamp drive unit 751 may control a direction indicating lamp, a brake lamp, and the like.

The steering drive unit 752 may electronically control a steering apparatus in the vehicle 200. Consequently, the steering drive unit 752 may change a heading of the vehicle.

The brake drive unit 753 may electronically control a brake apparatus in the vehicle 200. For example, the brake drive unit 753 may control an operation of a brake mounted at each wheel to reduce speed of the vehicle 200. In another example, the brake drive unit 753 may control operations of brakes mounted at left wheels and right wheels differently to adjust the heading of the vehicle 200 to the left or the right.

The power source drive unit 754 may electronically control a power source in the vehicle 200.

For example, in a case in which the power source is an engine using fossil fuel, the power source drive unit 754 may electronically control the engine. Consequently, the power source drive unit 754 may control output torque of the engine.

In another example, in a case in which the power source is an electric motor, the power source drive unit 754 may control the motor. Consequently, the power source drive unit 754 may control rotational speed and torque of the motor.

The sunroof drive unit 755 may electronically control a sunroof apparatus in the vehicle 200. For example, the sunroof drive unit 755 may control a sunroof to be opened or closed.

The suspension drive unit 756 may electronically control a suspension apparatus in the vehicle 200. For example, in a case in which a road surface is uneven, the suspension drive unit 756 may control the suspension apparatus to reduce vibration of the vehicle 200.

The air conditioning drive unit 757 may electronically control an air conditioner in the vehicle 200. For example, in a case in which the internal temperature of the vehicle is high, the air conditioning drive unit 757 may control the air conditioner to supply cool air into the vehicle.

The window drive unit 758 may electronically control a window apparatus in the vehicle 200. For example, the window drive unit 758 may control left and right side windows of the vehicle to be opened or closed.

The airbag drive unit 759 may electronically control an airbag apparatus in the vehicle 200. For example, the airbag drive unit 759 may control an airbag to deploy in a dangerous situation.

The sensor unit 760 senses a signal related to travel of the vehicle 200. To this end, the sensor unit 760 may include a heading sensor, a yaw sensor, a gyro sensor, a position module, a vehicle forward movement/backward movement sensor, a wheel sensor, a vehicle speed sensor, a vehicle body tilt sensor, a battery sensor, a fuel sensor, a tire sensor, a steering sensor, an in-vehicle temperature sensor, an in-vehicle humidity sensor, or another appropriate type of sensor.

Consequently, the sensor unit 760 may acquire a sensing signal for vehicle heading information, vehicle position information (GPS information), vehicle angle information, vehicle speed information, vehicle acceleration information, vehicle tilt information, vehicle forward movement/backward movement information, battery information, fuel information, tire information, vehicle lamp information, in-vehicle temperature information, in-vehicle humidity information, and the like.

In addition, the sensor unit 760 may further include an engine speed sensor, an air flow sensor (AFS), an intake air temperature sensor (ATS), a water temperature sensor (WTS), a throttle position sensor (TPS), a top dead center (TDC) sensor, and a crank angle sensor (CAS). The ECU 770 may control overall operation of each unit in the electronic control apparatus 700. The ECU 770 may perform a specific operation based on an input through the input unit 710, receive and transmit a signal sensed by the sensor unit 760 to the driver assistance apparatus 100, receive map information from the AVN apparatus 400, or control operations of the respective drive units 751, 752, 753, 754, and 756.

In addition, the ECU 770 may receive weather information and road traffic state information, such as TPEG information, from the communication unit 720. The display unit 780 may display an image related to an operation of the driver assistance apparatus. In order to display such an image, the display unit 780 may include a cluster or a HUD provided at the inside front of the vehicle. In a case in which the display unit 180 is the HUD, the display unit 180 may include a projection module to project an image on the front windshield glass of the vehicle 200. Meanwhile, the display unit 780 may include a touchscreen to allow input by tapping on the screen.

The audio output unit 785 converts an electric signal received from the ECU 770 into an audio signal and outputs the audio signal. To this end, the audio output unit 785 may include a speaker. The audio output unit 785 may output a sound corresponding to an operation of the input unit 710, e.g. a user control.

The electric power supply unit 790 may supply electric power to the respective components under control of the ECU 770. In particular, electric power from an in-vehicle battery may be supplied to the electric power supply unit 790.

Figure 8:
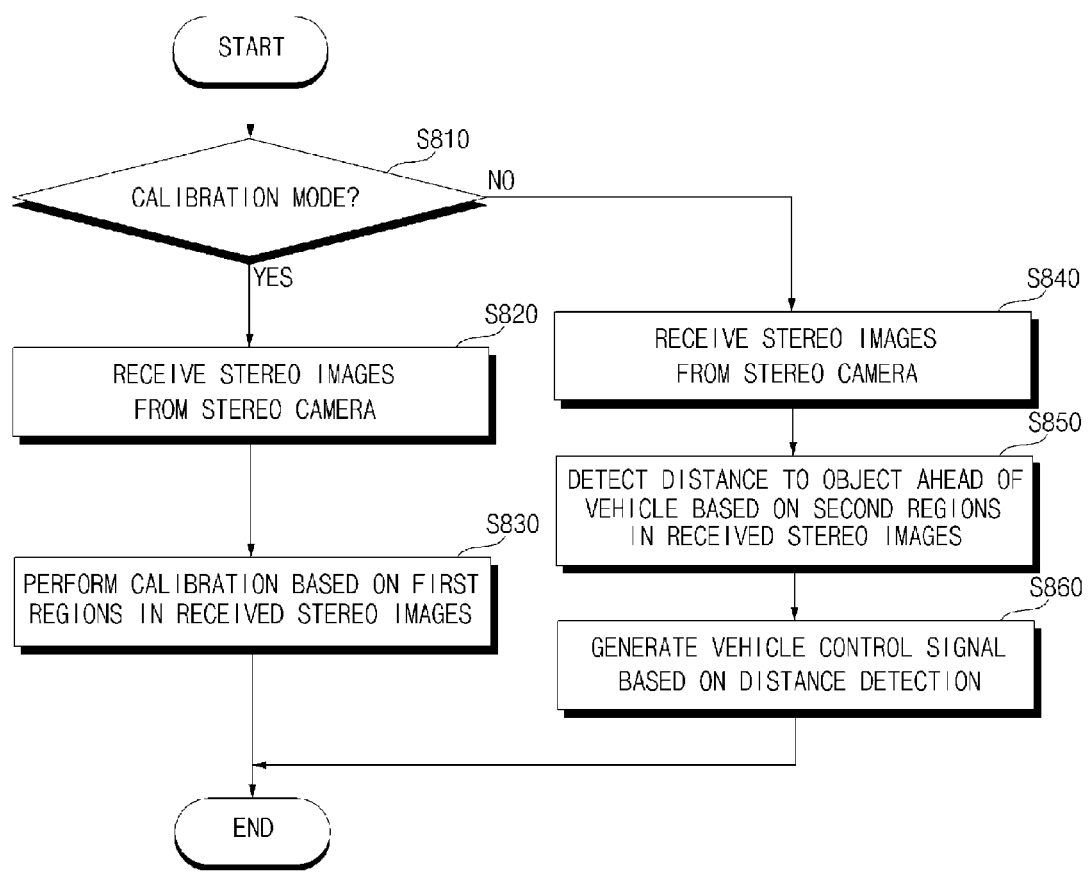
FIG. 8 is a flowchart showing an operation method of the driver assistance apparatus according to the embodiment of the present disclosure.

FIG. 8 is a flowchart showing an operation method of the driver assistance apparatus according to the embodiment of the present disclosure and FIGS. 9 to 12C are reference views illustrating the operation method of the driver assistance apparatus shown in FIG. 8.

Referring to FIGS. 8 and 9 to 12C, the processor 170 of the driver assistance apparatus 100 determines whether the driver assistance apparatus 100 is in a calibration mode (S810). Upon determining that the driver assistance apparatus 100 is in the calibration mode, the processor 170 receives stereo images from the stereo camera (S820). Subsequently, the processor 170 performs calibration based on first regions in the received stereo images (S830).

The processor 170 may control the driver assistance apparatus 100 to enter the calibration mode at the time of starting the vehicle, at the time of manipulating a predetermined user control, or at the time of temporarily stopping the vehicle during the travel of the vehicle. Alternatively, the processor 170 may control the calibration mode to be executed if an external impact applied to the vehicle is equal to or greater than a predetermined level.

During execution of the calibration mode, the processor 170 may calculate a disparity between first regions in the stereo images and compare the calculated disparity with a pre-stored reference disparity to calculate a calibration value. The calculated calibration value may be used when a disparity map is generated from the stereo images at a subsequent step.

Each first region may be a region including a particular object for a vehicle structure. The vehicle structure may be a portion of a body of the vehicle. The vehicle structure may include at least one of a character line, a hood emblem, and a hood edge line of the vehicle. Alternatively, each first region may be a region including an object for a structure external to the vehicle. The structure external to the vehicle may include at least one of a traffic sign, a signal light, and a streetlight.

During execution of the calibration mode, on the other hand, the driver assistance apparatus 100 may control an indicator that indicates the calibration mode to be displayed through the display unit 180 or 780, control a sound that indicates the calibration mode to be output through the audio output unit 185 or 785, or control the indicator that indicates the calibration mode to be displayed through the display unit 180 or 780 while controlling the sound that indicates the calibration mode to be output through the audio output unit 185 or 785.

Alternatively, during execution of the calibration mode, the driver assistance apparatus 100 may control at least one of an indicator indicating a calibration range or a calibration value, information regarding progress time of the calibration mode, and information regarding remaining time of the calibration mode to be displayed through the display unit 180 or 780.

Upon determining at step S810 that the driver assistance apparatus 100 is not in the calibration mode, i.e., the driver assistance apparatus 100 is in a normal mode, the processor 170 of the driver assistance apparatus 100 receives stereo images from the stereo camera (S840). Subsequently, the processor 170 detects the distance to an object ahead of the vehicle based on second regions in the received stereo images (S850). Subsequently, the processor 170 generates a vehicle control signal based on the detected distance to the object (S860).

Each second region may be a region which does not include an object for a vehicle structure. Alternatively, each second region may be a region which does not include an object for a structure external to the vehicle.

For example, during execution of the normal mode after completion of the calibration mode, the processor 170 may calibrate the second regions in the stereo images using the calibration value calculated in the calibration mode and detect the distance to the object ahead of the vehicle based on the calibrated second regions in the stereo images.

On the other hand, the processor 170 may detect an object based on the calibrated second regions in the stereo images and continuously track motion of the object after detection of the object. In addition, the processor 170 may calculate the distance to an adjacent vehicle, speed of the detected adjacent vehicle, and a difference in speed with the detected adjacent vehicle.

Alternatively, the processor 170 may generate and output a control signal for attitude control or travel control of the vehicle 200 based on the calculated speed of the adjacent vehicle and the calculated distance to the adjacent vehicle. For example, the processor 170 may generate a control signal to control at least one of the steering drive unit 752, the brake drive unit 753, the power source drive unit 754, and the suspension drive unit 756 in the vehicle.

In addition, if an error between the distance to the object detected based on the sensor information of the vehicle received through the interface unit 130 and the distance to the object detected based on the stereo images is equal to or greater than a predetermined value, the processor 170 of the driver assistance apparatus 100 may control the calibration mode to be re-executed or the calibration value to be adjusted in the normal mode.

For example, if the distance to an object ahead of the vehicle detected based on the stereo images is calculated as a first distance and, in this state, the distance to the same object ahead of the vehicle is calculated as a second distance based on the vehicle speed information acquired by the vehicle speed sensor, the processor 170 may calculate an error between the first distance and the second distance.

If the error between the first distance and the second distance is equal to or greater than a predetermined value, the processor 170 may control the calibration mode to be automatically re-executed or the calibration value to be adjusted in the normal mode.

In addition, the calibration mode may be re-executed irrespective of starting the vehicle, manipulating a predetermined user control, whether external impact applied to the vehicle is equal to or greater than a predetermined level, or temporarily stopping the vehicle during travel of the vehicle as described above.

Alternatively, in a case in which the error between the distance to the object detected based on the sensor information of the vehicle and the distance to the object detected based on the stereo images is equal to or greater than the predetermined value, the processor 170 may control a notification message to be output through at least one of the display unit 180 or 780 and the audio output unit 185 or 785. Alternatively, the processor 170 may release control of the vehicle.

That is, in a case in which the error between the distance to the object detected based on the sensor information of the vehicle and the distance to the object detected based on the stereo images is equal to or greater than the predetermined value, the processor 170 may control a notification message to be output and, when a user pushes an input user control, control the calibration mode to be manually re-executed.

Figure 9:
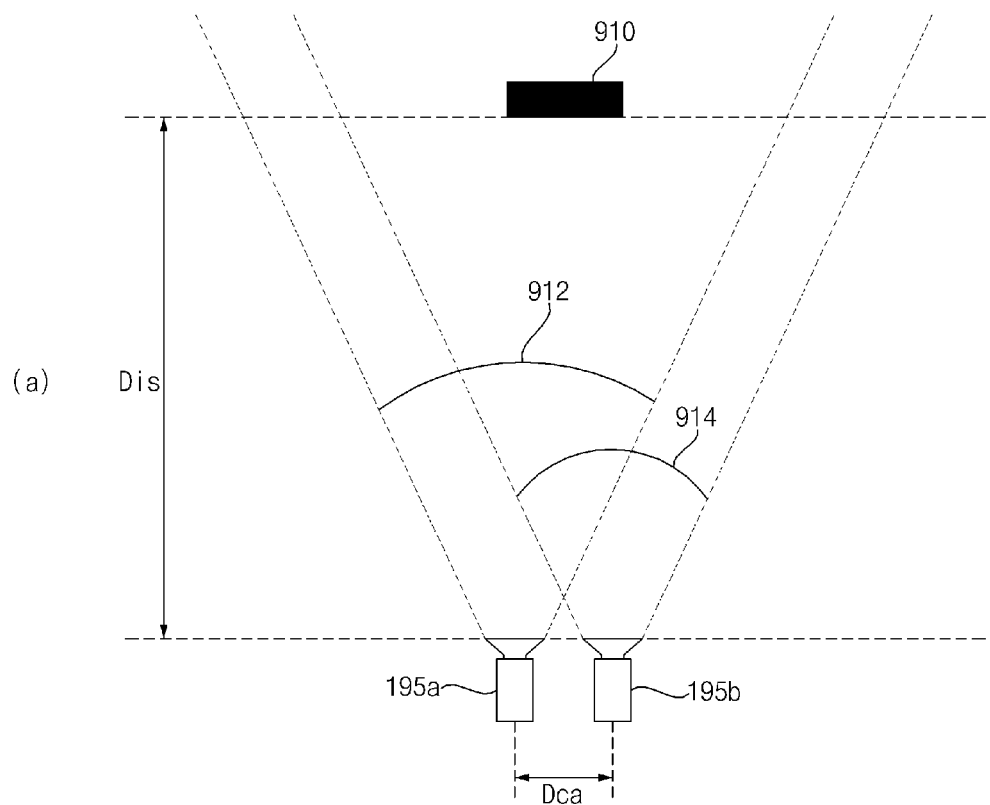
FIGS. 9 to 12C are reference views illustrating the operational method of the driver assistance apparatus shown in FIG. 8.
Figure 9:
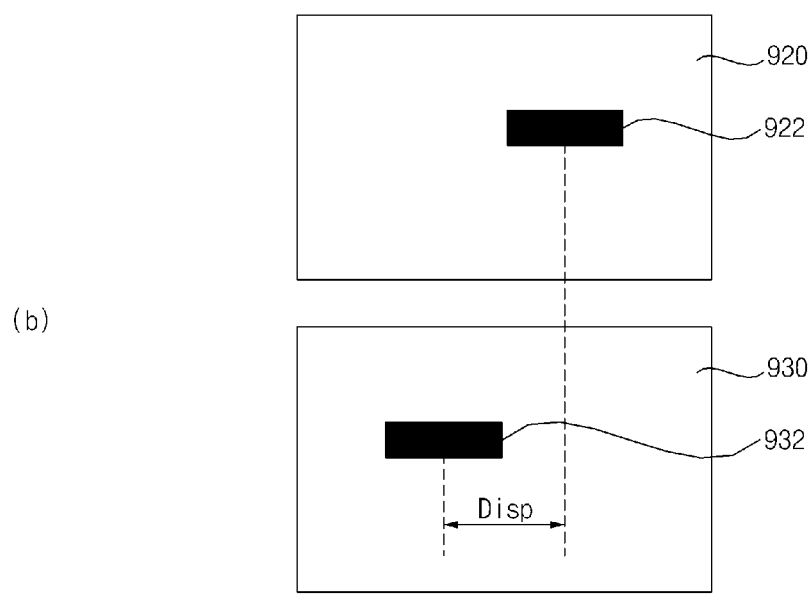

By way of example, FIG. 9 shows a left eye camera 195a and a right eye camera 195b of the stereo camera 195 photograph a subject 910 ahead of the vehicle.

By way of example, FIG. 9(a) shows a view angle 912 of the left eye camera 195a and a view angle 914 of the right eye camera 195b. In addition, FIG. 9(a) shows that the left eye camera 195a and the right eye camera 195b are spaced apart from each other by a distance Dca. Furthermore, FIG. 9(a) shows that the subject 910 is spaced apart from the left eye camera 195a and the right eye camera 195b by a distance Dis.

By way of example, FIG. 9(b) shows a right eye image 920 from the right eye camera 195b and a left eye image 930 from the left eye camera 195a, which are photographed under the conditions described in connection with FIG. 9(a).

Subjects 922 and 932 in the images 920 and 930 are different in position from each other. Consequently, the processor 170 calculates a difference in position between the subjects 922 and 932 in the images 920 and 930, i, a disparity Disp between the subjects 922 and 932, and calculates the distance Dis of a real subject using the disparity Disp between the subjects 922 and 932 and the distance Dca between the left eye camera 195a and the right eye camera 195b.

The position of the driver assistance apparatus 100, particularly the stereo camera 195, mounted inside the vehicle may be changed due to various external factors, such as collision of the vehicle, detouring around an obstacle, change in the heading of the vehicle, during driving of the vehicle, and the like.

In particular, the horizontal distance between the left eye camera 195a and the right eye camera 195b may be greater than or less than the initially set distance Dca. In addition, the vertical distance between the left eye camera 195a and the right eye camera 195b may be changed.

In a case in which the distance measurement is performed based on stereo images photographed by the left eye camera 195a and the right eye camera 195b, a significant distance error may occur due to change in the horizontal distance or the vertical distance between the left eye camera 195a and the right eye camera 195b. On the other hand, if after the same objects in the images are detected, a disparity between the objects is calculated, the calculation result is increased due to a change in position of the objects in the images with the result that calculation time is increased.

In the present disclosure, the stereo camera is calibrated through the calibration mode in consideration of the change in the horizontal distance or the vertical distance between the left eye camera 195a and the right eye camera 195b.

The calibration mode may be executed at the time of starting the vehicle when the driver assistance apparatus 100, particularly the stereo camera 195, starts to operate.

Alternatively, the calibration mode may be executed through manipulation of a predetermined user control of the input unit 710 of the vehicle or the input unit 110 of the driver assistance apparatus 100.

On the other hand, in a case in which an impact amount or a vibration amount is sensed through an impact sensor or a vibration sensor, respectively, provided in the vehicle during travel of the vehicle is equal to or greater than a predetermined value, the processor 170 may control the calibration mode to be executed.

Meanwhile, in order to immediately execute the calibration mode at the time of starting the vehicle, the calibration mode may be executed based on common subjects in the images photographed by the stereo camera 195, for example.

Each of the common subjects may be a portion of a body of the vehicle. Each of the common subjects may include at least one of a character line, a hood emblem, and a hood edge line of the vehicle.

Alternatively, the calibration mode may be executed at the time of manipulating a predetermined user control or at the time of temporarily stopping the vehicle during travel of the vehicle.

In order to execute the calibration mode at the time of manipulating the predetermined user control or at the time of temporarily stopping the vehicle during travel of the vehicle, the calibration mode may be executed based on a structure outside the vehicle. The structure outside the vehicle may include at least one of a traffic sign, a signal light, and a streetlight.

Figure 10A:
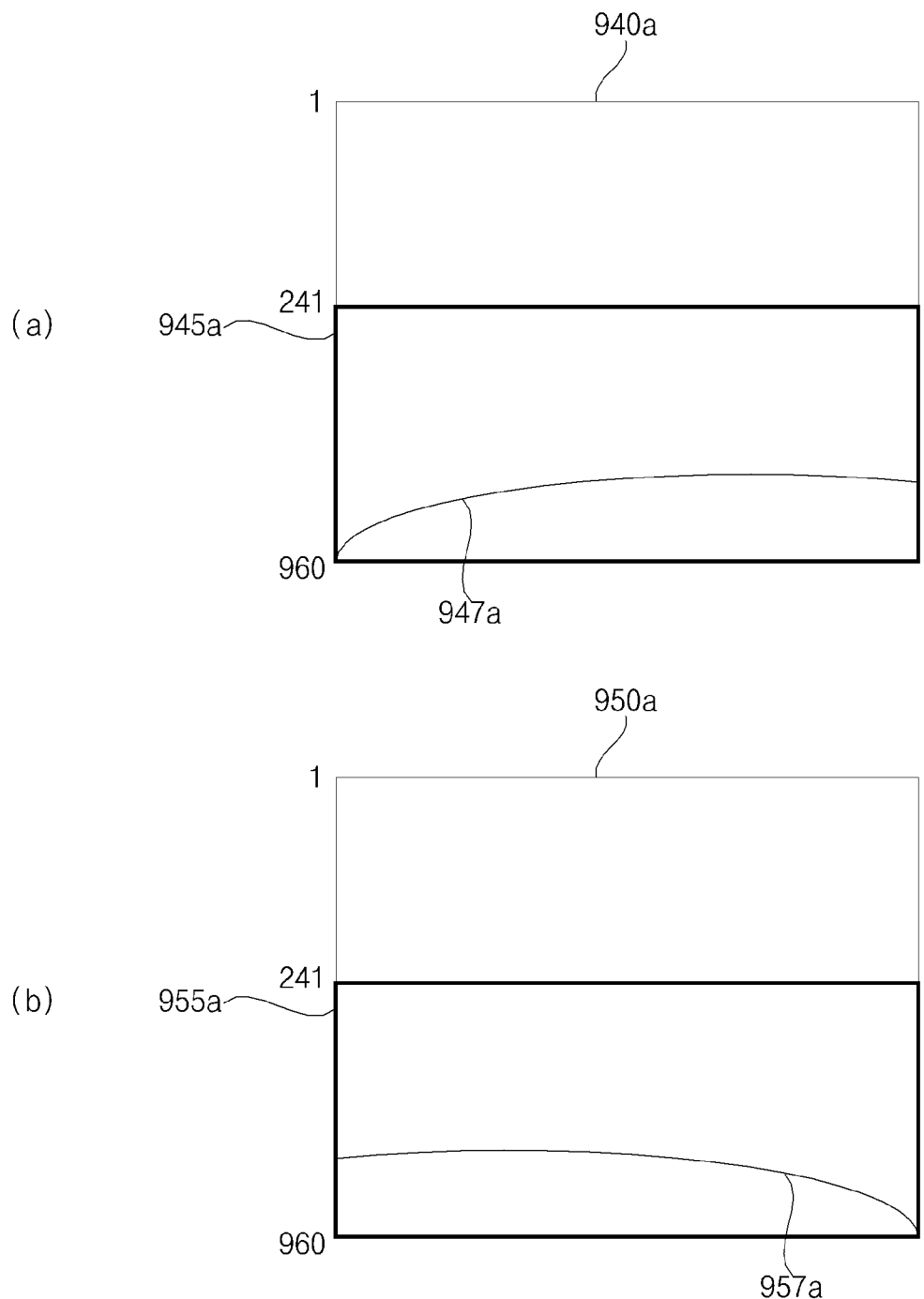
Figure 10B:
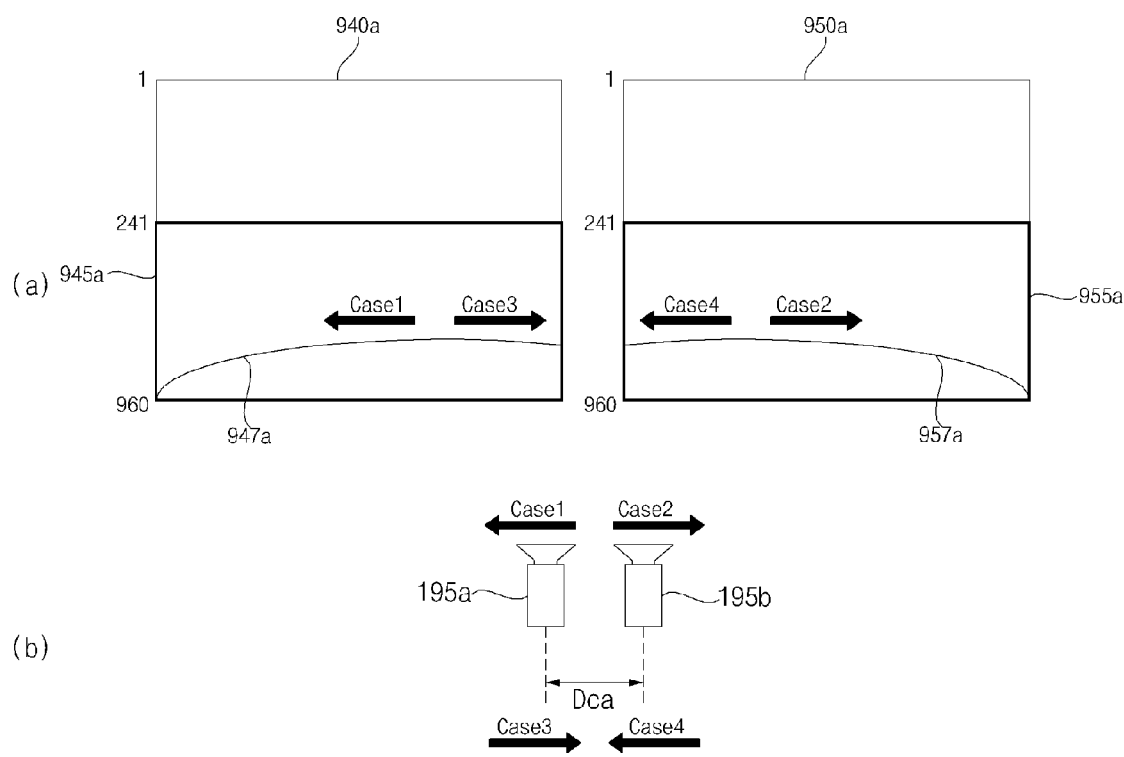
Figure 10C:
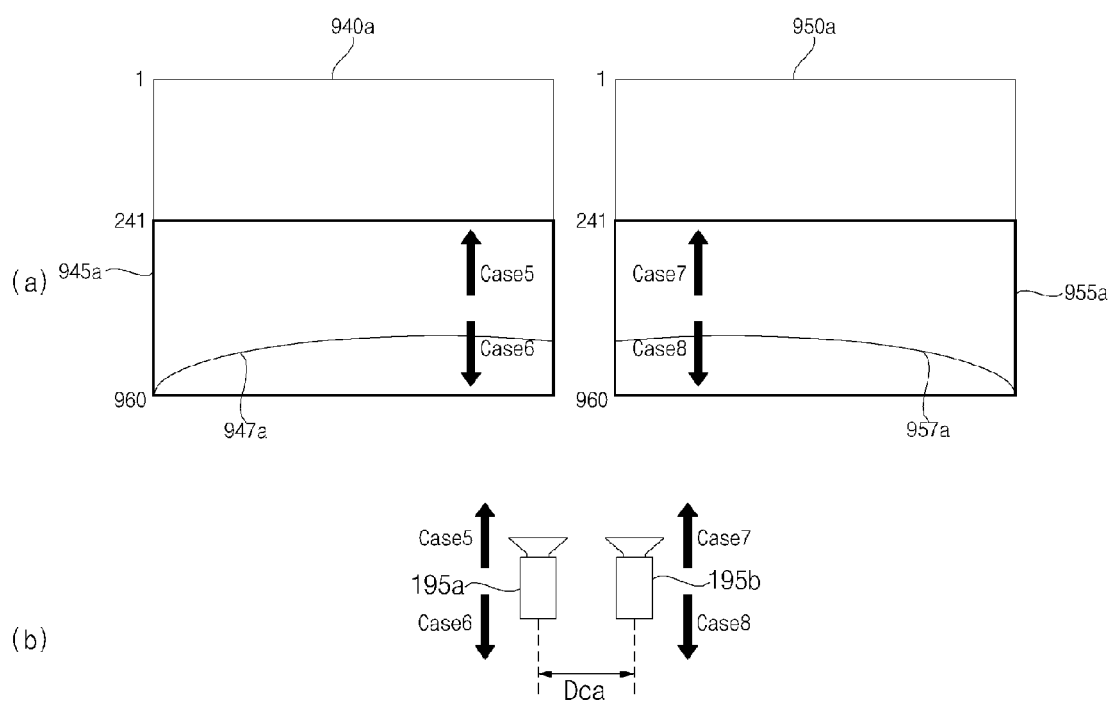

By way of example, FIGS. 10A to 10C show that the calibration mode is executed based on images containing vehicle structures photographed by the stereo camera 195. FIG. 10A shows a left eye image 940a and a right eye image 950a photographed by the stereo camera 195. In particular, the left eye image 940a and the right eye image 950a may contain hood edge lines 947a and 957a, which are portions of the body of the vehicle.

Meanwhile, in the calibration mode, the first regions of the left eye image 940a and the right eye image 950a photographed by the stereo camera 195, which are partial regions of the left eye image 940a and the right eye image 950a, may be used. Lower regions 945a and 955a of the left eye image 940a and the right eye image 950a are used. For example, in a case in which the number of vertical lines of each of the left and right eye images 940a and 950a is 960, first regions of the left eye image 940a and the right eye image 950a corresponding to portions, for example 720 lines, of the left eye image 940a and the right eye image 950a may be used. That is, regions from line number 241 to line number 960, corresponding to lower regions 945a and 955a, may be used.

As shown in FIG. 10A, since the hood edge lines 947a and 957a are contained in the lower regions 945a and 955a of the left eye image 940a and the right eye image 950a. The hood edge lines 947a and 957a may be used as common subjects to calculate a calibration value.

For example, in a case in which a reference left eye image and a reference right eye image containing hood edge lines are stored in the memory, the photographed left eye image and right eye image may be compared with the reference left eye image and the reference right eye image to acquire a difference therebetween during execution of the calibration mode. The difference therebetween may be numerically expressed and calculated as a calibration value.

For example, when at least one selected from between the left eye camera 195a and the right eye camera 195b of the stereo camera 195 moves in a horizontal direction as shown in FIG. 10B, the processor 170 may calculate a horizontal calibration value as the calibration value during execution of the calibration mode.

Alternatively, when at least one selected from between the left eye camera 195a and the right eye camera 195b of the stereo camera 195 moves in a vertical direction as shown in FIG. 10O, the processor 170 may calculate a vertical calibration value as the calibration value during execution of the calibration mode.

By way of example, FIG. 10B shows various horizontal movements of the left eye camera 195a or the right eye camera 195b of the stereo camera 195. Case 1 shows, that the left eye camera 195a moves to the left, case 2 shows that the right eye camera 195b moves to the right, case 3 shows that the left eye camera 195a moves to the right, and case 4 shows that the right eye camera 195b moves to the left.

In cases 1 to 4, movements of the hood edge lines 947a and 957a appear in the left eye image 940a photographed by the left eye camera 195a and the right eye image 950a photographed by the right eye camera 195b.

The processor 170 may check movements (cases 1 to 4) of the hood edge lines 947a and 957a in the left eye image 940a photographed by the left eye camera 195a and the right eye image 950a photographed by the right eye camera 195b based on the reference left eye image and the reference right eye image and set a calibration value in directions opposite to the movement directions of the hood edge lines 947a and 957a.

Even in a case in which cases 1 to 4 are combined, on the other hand, the processor 170 may set a calibration value in consideration of a combination of the cases.

By way of example, FIG. 10C shows various vertical movements of the left eye camera 195a or the right eye camera 195b of the stereo camera 195. Case 5 shows that the left eye camera 195a moves upward, case 6 shows that the left eye camera 195a moves downward, case 7 shows that the right eye camera 195b moves upward, and case 8 shows that the right eye camera 195b moves downward.

In cases 5 to 8, movements of the hood edge lines 947a and 957a appear in the left eye image 940a photographed by the left eye camera 195a and the right eye image 950a photographed by the right eye camera 195b.

The processor 170 may check movements (cases 5 to 8) of the hood edge lines 947a and 957a in the left eye image 940a photographed by the left eye camera 195a and the right eye image 950a photographed by the right eye camera 195b based on the reference left eye image and the reference right eye image and set a calibration value in directions opposite to the movement directions of the hood edge lines 947a and 957a.

Even in a case in which cases 5 to 8 are combined, on the other hand, the processor 170 may set a calibration value in consideration of combination of the cases.

Figure 10D:
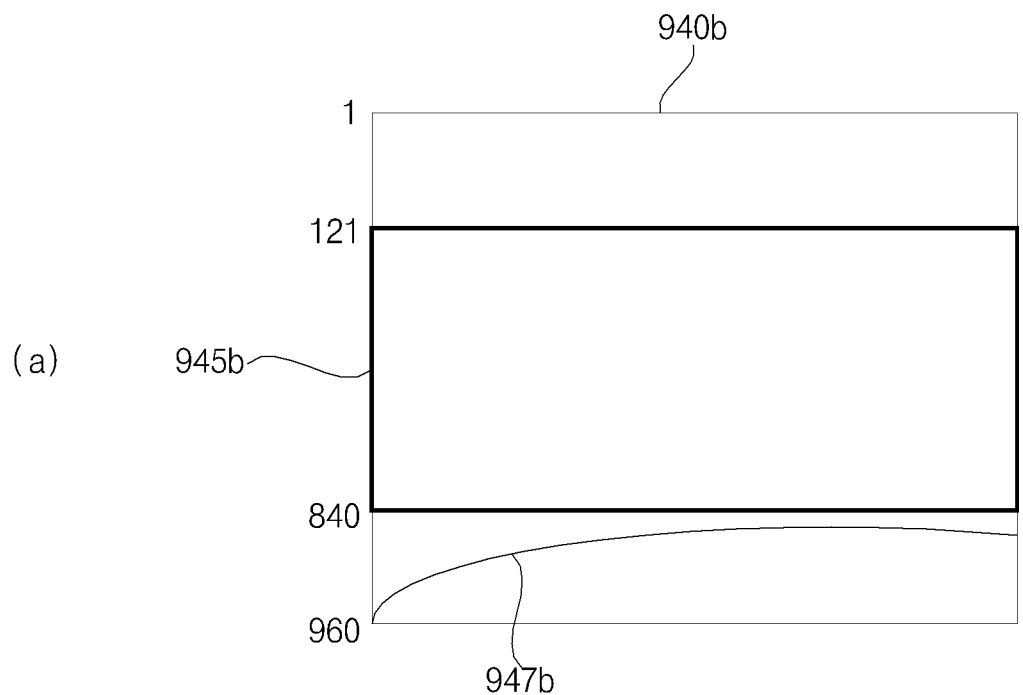
Figure 10D:
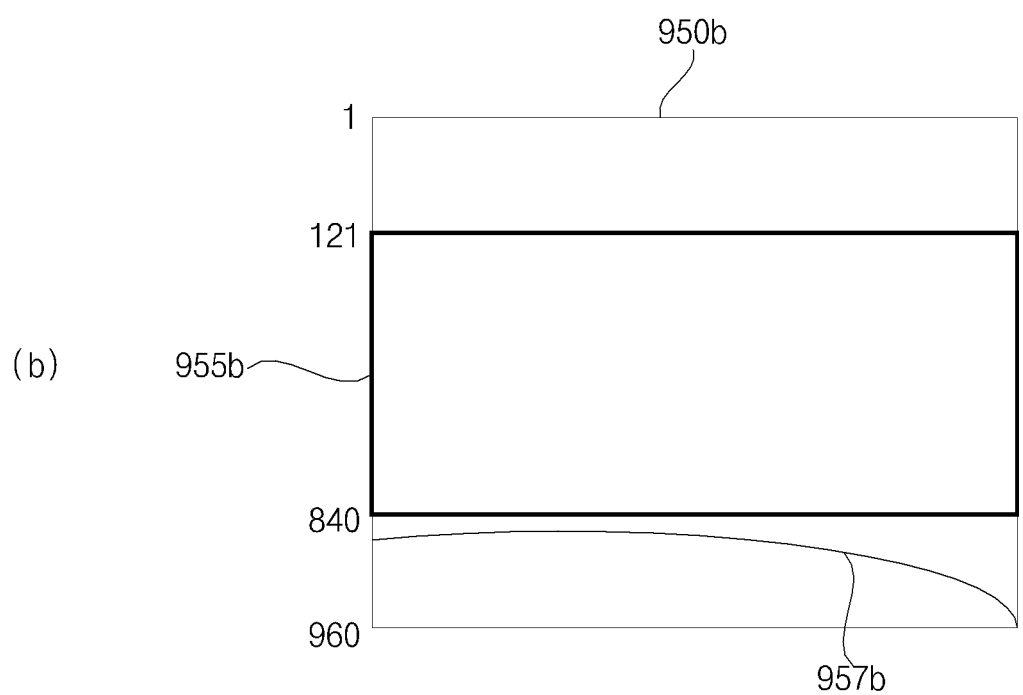

By way of example, FIG. 10D shows that a normal mode is executed based on images photographed by the stereo camera 195. In the normal mode, second regions of a left eye image 940b and a right eye image 950b photographed by the stereo camera 195, which are partial regions of the left eye image 940b and the right eye image 950b, may be used. In this case, the second regions may not include portions of the body of the vehicle. The middle regions 945b and 955b of the left eye image 940b and the right eye image 950b are used.

For example, in a case in which the number of vertical lines of each of the left and right eye images 940b and 950b is 960, second regions of the left eye image 940b and the right eye image 950b corresponding to portions, for example 720 lines, of the left eye image 940b and the right eye image 950b may be used. That is, regions from line number 121 to line number 840 may be used.

As a result, hood edge lines 947b and 957b are not contained in the middle regions 945b and 955b of the left eye image 940b and the right eye image 950b.

The processor 170 may detect the distance to the object ahead of the vehicle based on the stereo images acquired from the view ahead of the vehicle, particularly the images 945b and 955b for the second regions.

In particular, after completion of the calibration mode, the processor 170 may apply the calibration value to the images 945b and 955b for the second regions to detect the distance to the object ahead of the vehicle based on the calibrated images for the second regions. Consequently, it is possible to accurately perform distance detection.

Figure 10E:
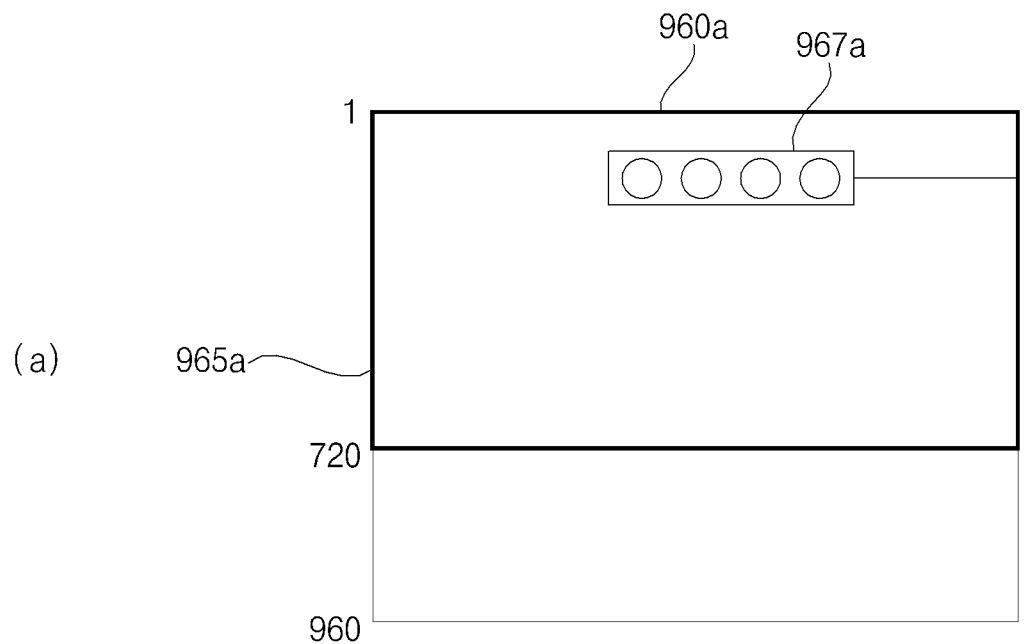
Figure 10E:
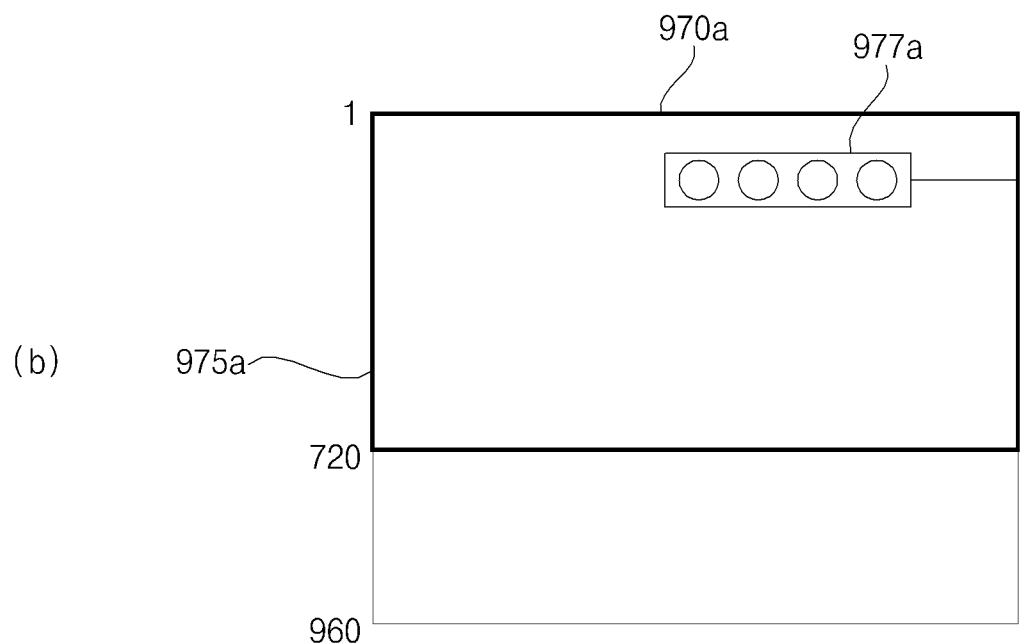
Figure 10F:
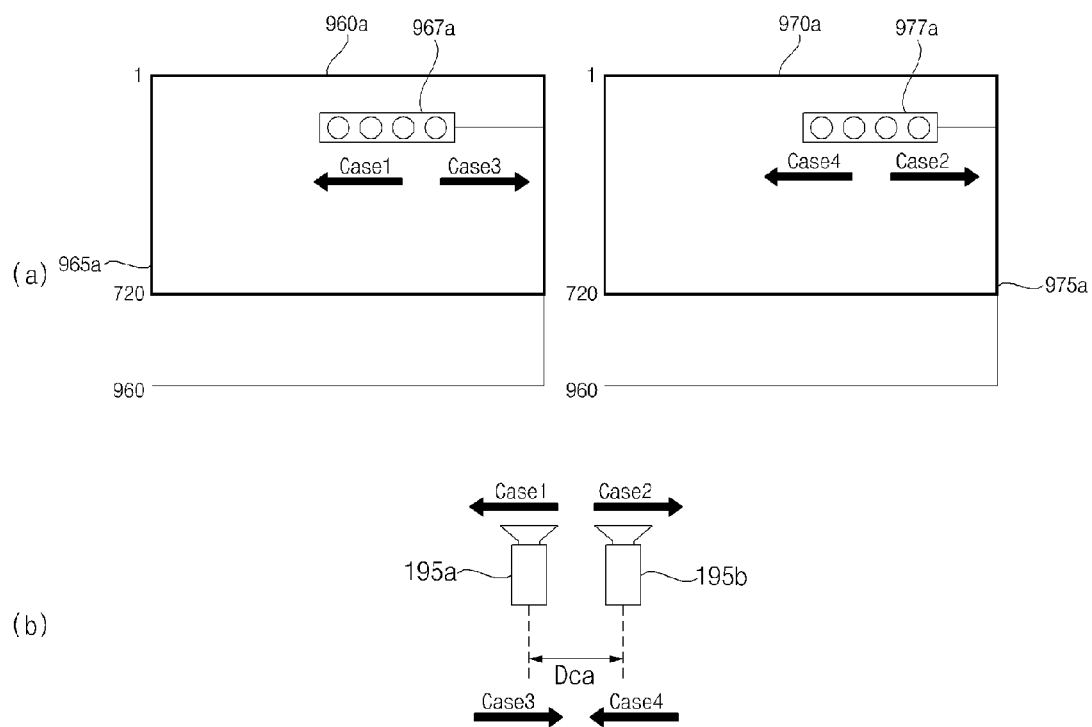
Figure 10G:
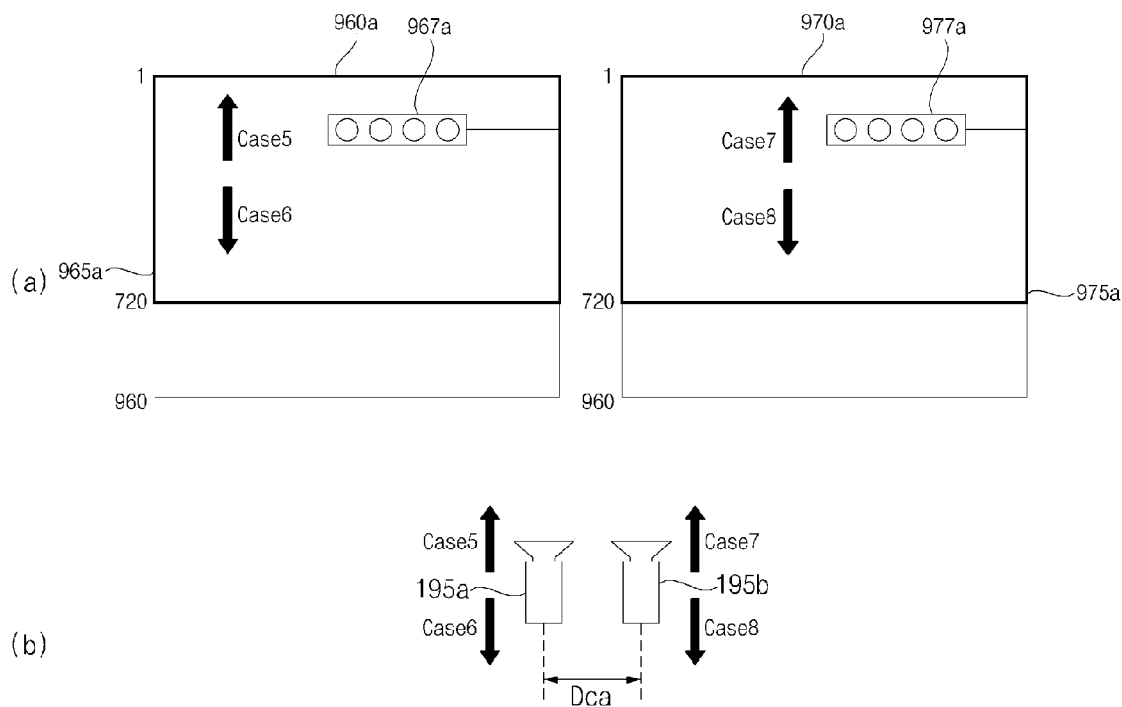

By way of example, FIGS. 10E to 10G show that the calibration mode is executed based on images containing structures external to the vehicle photographed by the stereo camera 195.

FIG. 10E shows, by way of example, a left eye image 960a and a right eye image 970a photographed by the stereo camera 195. In particular, the left eye image 960a and the right eye image 970a may contain signal lights 967a and 977a, respectively, which are one of the structures outside the vehicle.

In the calibration mode, first regions of the left eye image 960a and the right eye image 970a photographed by the stereo camera 195, which are partial regions of the left eye image 960a and the right eye image 970a, may be used. FIG. 10E shows that upper regions 965a and 975a of the left eye image 960a and the right eye image 970a are used.

For example, in a case in which the number of vertical lines of each of the left and right eye images 960a and 970a is 960, first regions of the left eye image 960a and the right eye image 970a corresponding to portions, for example 720 lines, of the left eye image 960a and the right eye image 970a may be used. That is, regions from line number 1 to line number 720 may be used.

As shown in FIG. 10E, therefore, the signal lights 967a and 977a are contained in the upper regions 965a and 975a of the left eye image 960a and the right eye image 970a. The signal lights 967a and 977a may be used as common subjects to calculate a calibration value.

For example, when at least one selected from between the left eye camera 195a and the right eye camera 195b of the stereo camera 195 moves in a horizontal direction as shown in FIG. 10F, the processor 170 may calculate a horizontal calibration value as the calibration value during execution of the calibration mode.

Alternatively, when at least one selected from between the left eye camera 195a and the right eye camera 195b of the stereo camera 195 moves in a vertical direction as shown in FIG. 10G, the processor 170 may calculate a vertical calibration value as the calibration value during execution of the calibration mode.

FIG. 10F shows, by way of example, various horizontal movements of the left eye camera 195a or the right eye camera 195b of the stereo camera 195.

Referring to FIG. 10F, case 1 shows that the left eye camera 195a moves to the left, case 2 shows that the right eye camera 195b moves to the right, case 3 shows that the left eye camera 195a moves to the right, and case 4 shows that the right eye camera 195b moves to the left.

In cases 1 to 4, movements of the signal lights 967a and 977a appear in the left eye image 960a photographed by the left eye camera 195a and the right eye image 970a photographed by the right eye camera 195b.

The processor 170 may check movements (cases 1 to 4) of the signal lights 967a and 977a in the left eye image 960a photographed by the left eye camera 195a and the right eye image 970a photographed by the right eye camera 195b based on the reference left eye image and the reference right eye image and set a calibration value in directions opposite to the movement directions of the signal lights 967a and 977a.

Even in a case in which cases 1 to 4 are combined, on the other hand, the processor 170 may set a calibration value in consideration of combination of the cases.

FIG. 10G shows, by way of example, various vertical movements of the left eye camera 195a or the right eye camera 195b of the stereo camera 195.

Referring to FIG. 10G, case 5 shows that the left eye camera 195a moves upward, case 6 shows that the left eye camera 195a moves downward, case 7 shows that the right eye camera 195b moves upward, and case 8 shows that the right eye camera 195b moves downward.

In cases 5 to 8, movements of the signal lights 967a and 977a appear in the left eye image 960a photographed by the left eye camera 195a and the right eye image 970a photographed by the right eye camera 195b.

The processor 170 may check movements (cases 5 to 8) of the signal lights 967a and 977a in the left eye image 960a photographed by the left eye camera 195a and the right eye image 970a photographed by the right eye camera 195b based on the reference left eye image and the reference right eye image and set a calibration value in directions opposite to the movement directions of the signal lights 967a and 977a.

Even in a case in which cases 5 to 8 are combined, on the other hand, the processor 170 may set a calibration value in consideration of combination of the cases.

Figure 10H:
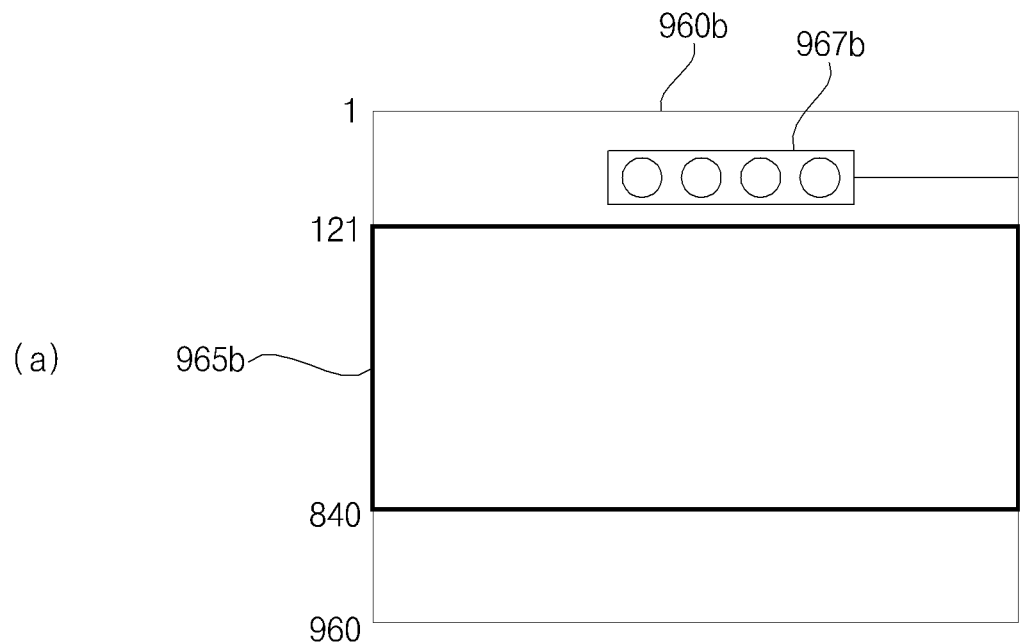
Figure 10H:
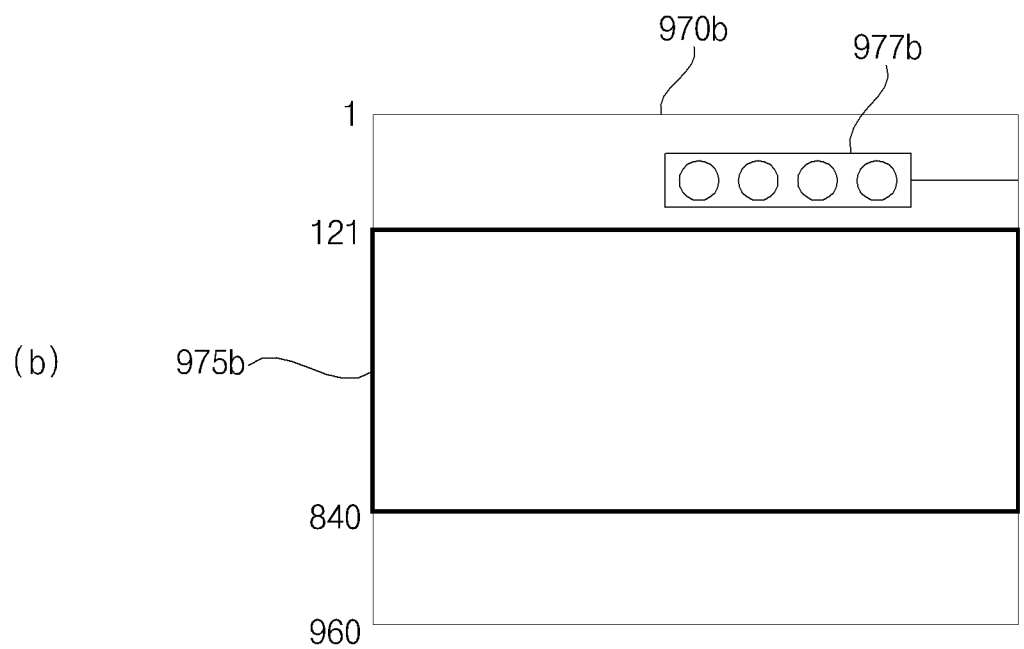

FIG. 10H shows, by way of example, that a normal mode is executed based on images photographed by the stereo camera 195.

In the normal mode, second regions of a left eye image 960b and a right eye image 970b photographed by the stereo camera 195, which are partial regions of the left eye image 960b and the right eye image 970b, may be used. In this case, the second regions may not include the signal lights.

FIG. 10H shows, by way of example, that middle regions 965b and 975b of the left eye image 960b and the right eye image 960b are used.

For example, in a case in which the number of vertical lines of each of the left and right eye images 960b and 970b is 960, second regions of the left eye image 960b and the right eye image 970b corresponding to portions, for example 720 lines, of the left eye image 960b and the right eye image 970b may be used. That is, regions from line number 121 to line number 840 may be used.

As a result, signal lights 967b and 977b are not contained in the middle regions 965b and 975b of the left eye image 960b and the right eye image 970b.

The processor 170 may detect the distance to the object ahead of the vehicle based on the stereo images acquired from the view ahead of the vehicle, particularly the images 965b and 975b for the second regions.

In particular, after completion of the calibration mode, the processor 170 may apply the calibration value to the images 965b and 975b for the second regions to detect the distance to the object ahead of the vehicle based on the calibrated images for the second regions. Consequently, it is possible to accurately perform distance detection.

Figure 11:
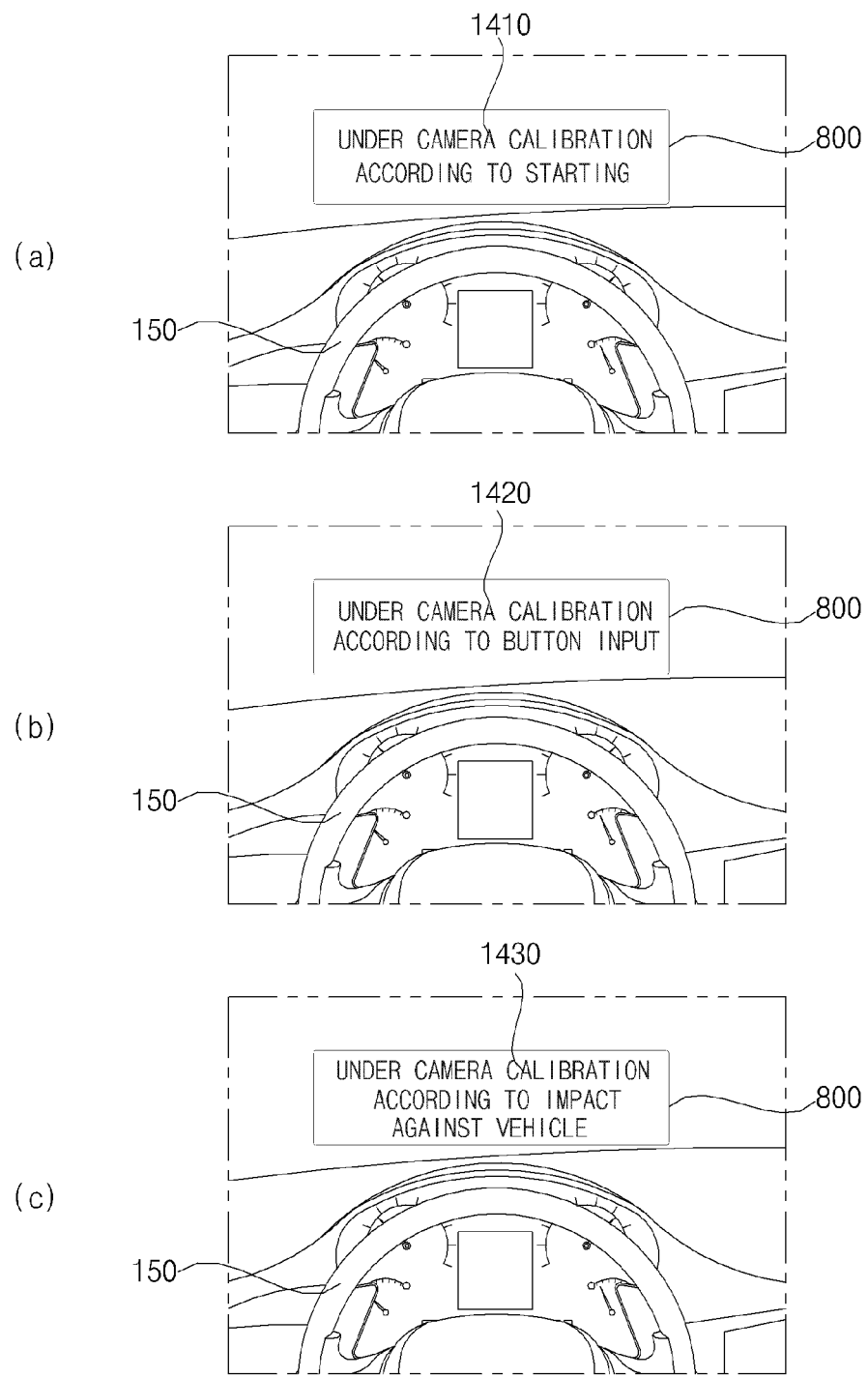
Figure 12A:
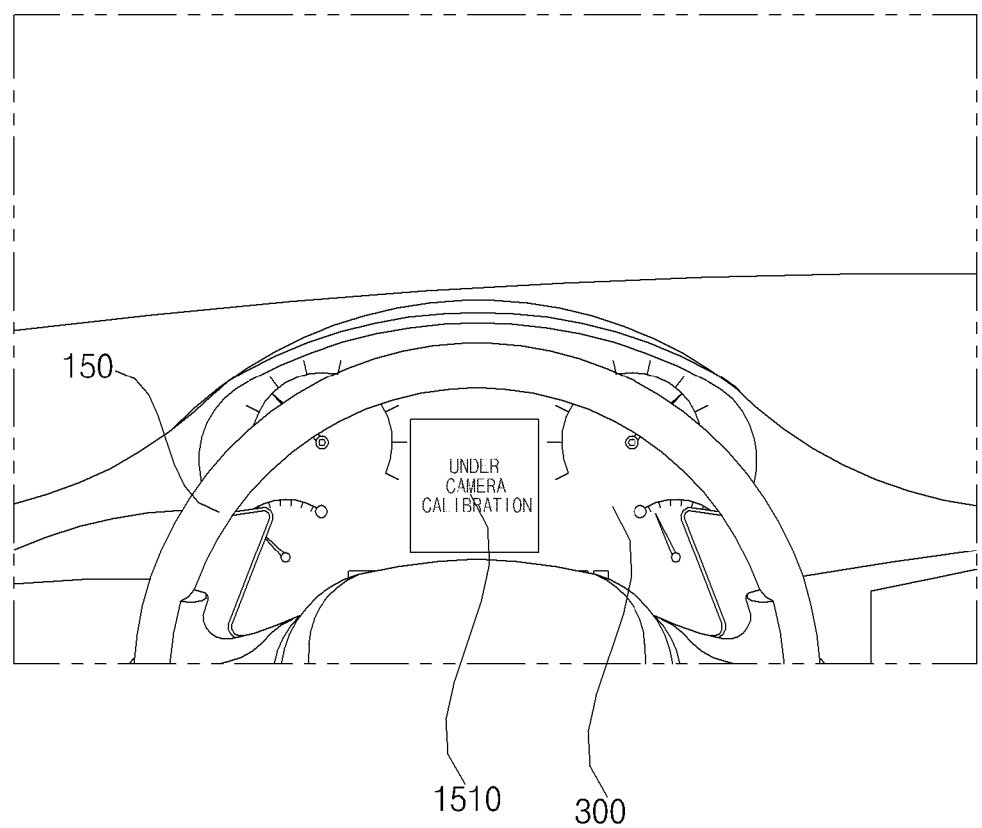
Figure 12B:
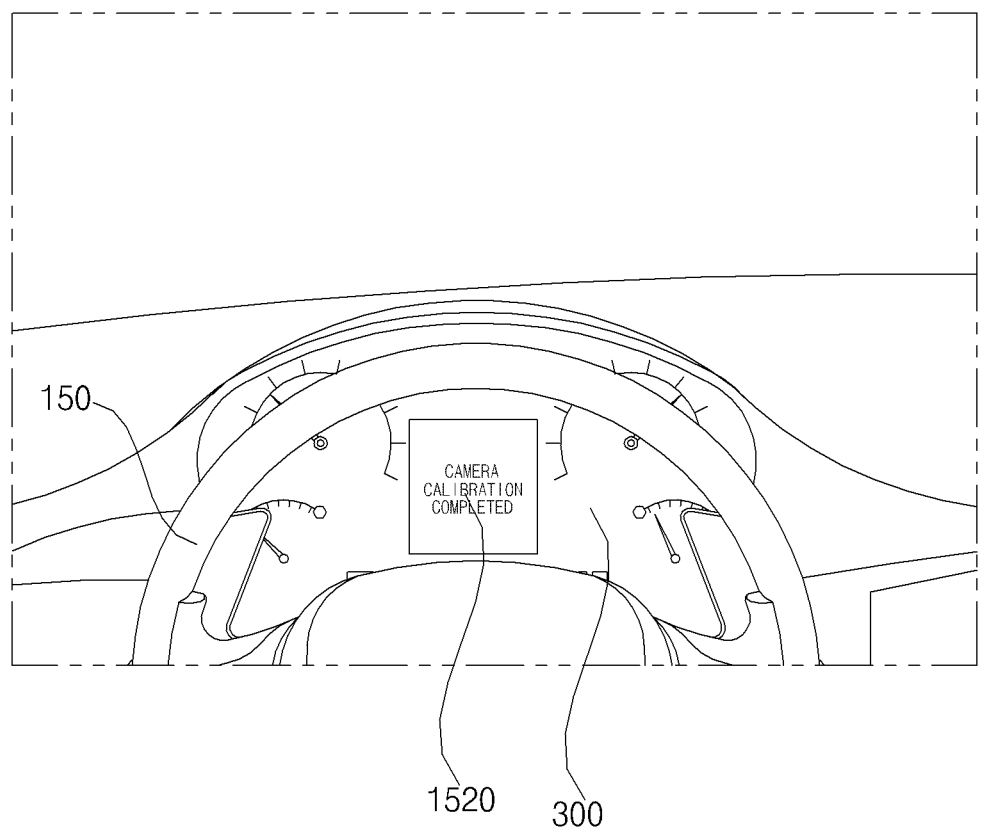
Figure 12C:
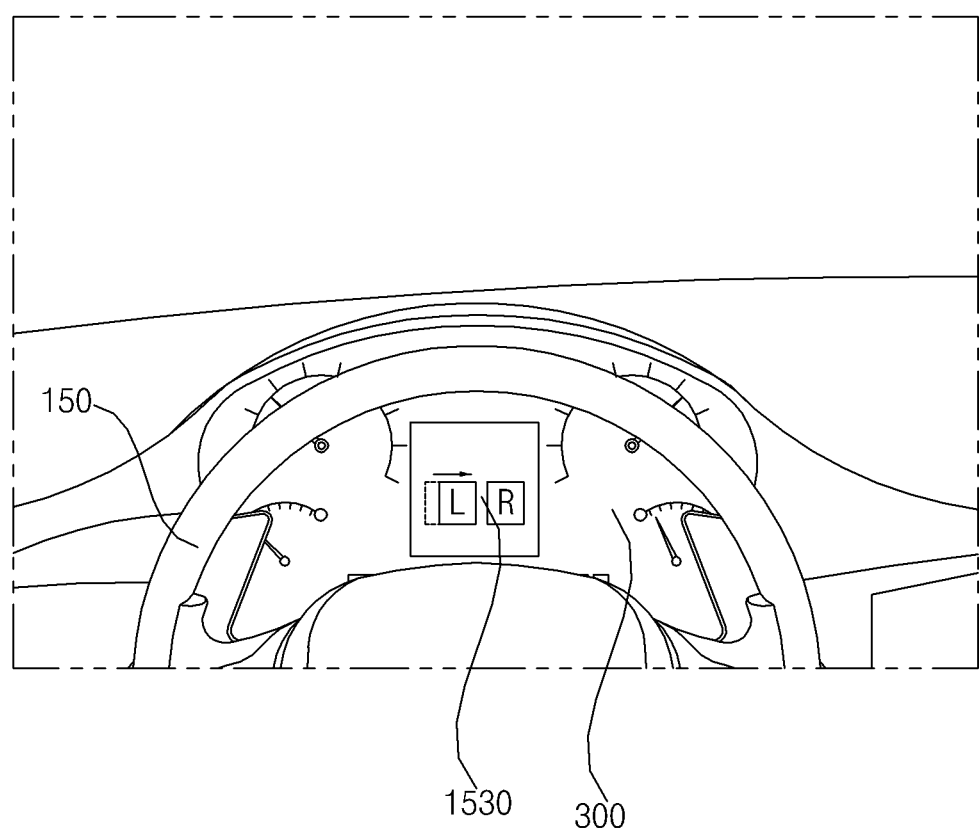

By way of example, FIGS. 11 to 12C show various user interfaces for calibration modes.

FIG. 11 shows that indicators indicating calibration modes are output through a HUD type display unit.

For example, an indicator 1410 indicating a calibration mode at the time of starting the vehicle may be displayed in an output region 800, an indicator 1420 indicating a calibration mode according to user control input may be displayed in the output region 800, or an indicator 1430 indicating a calibration mode according to impact against the vehicle may be displayed in the output region 800.

On the other hand, when each calibration mode is completed, an indicator indicating completion of the calibration mode may be displayed in the output region 800.

Meanwhile, unlike FIG. 11, at least one of an indicator indicating a calibration range or a calibration value, information regarding progress time of the calibration mode, and information regarding remaining time of the calibration mode may be displayed in the output region 800 during execution of the calibration mode.

Alternatively, in a case in which an error between the distance to the object detected based on the sensor information of the vehicle and the distance to the object detected based on the stereo images is equal to or greater than a predetermined value, a notification message may be output to the output region 800.

By way of example, FIGS. 12A to 12C show that indicators indicating calibration modes are output to a cluster 300.

FIG. 12A shows that an indicator 1510 indicating a camera calibration mode is displayed in the cluster 300, FIG. 12B shows that an indicator 1520 indicating a camera calibration completion mode is displayed in the cluster 300, and FIG. 12C shows that an indicator 1530 indicating a camera calibration range is displayed in the cluster 300. Consequently, it is possible for a user to intuitively recognize that calibration is being performed or has been completed.

Particularly, in FIG. 12C, the indicator 1530 indicates that a left eye image acquired by the left eye camera is moved to the left, i.e., the calibration value is set to a value for movement to the right. At this time, the length or size of an arrow may be proportional to the calibration value. Consequently, it is possible for the user to intuitively recognize a calibration range.

Meanwhile, unlike FIGS. 12A to 12C, at least one of an indicator indicating a calibration range or a calibration value, information regarding progress time of the calibration mode, and information regarding remaining time of the calibration mode may be displayed in the cluster 300 during execution of the calibration mode.

Alternatively, in a case in which an error between the distance to the object detected based on the sensor information of the vehicle and the distance to the object detected based on the stereo images is equal to or greater than a predetermined value, a notification message may be output to the cluster 300.

Meanwhile, unlike FIGS. 11 to 12C, a sound indicating the calibration mode or a sound indicating completion of the calibration mode may be output through the audio output unit 185 or 785.

On the other hand, at least one of an indicator indicating a calibration range or a calibration value, information regarding progress time of the calibration mode, and information regarding remaining time of the calibration mode may be output through the audio output unit 185 or 785 during execution of the calibration mode.

Alternatively, in a case in which an error between the distance to the object detected based on the sensor information of the vehicle and the distance to the object detected based on the stereo images is equal to or greater than a predetermined value, a notification message may be output through the audio output unit 185 or 785.

The user interfaces as described above may be executed under control of the processor 170.

Meanwhile, after completion of the calibration, the processor 170 may perform attitude control of the vehicle based on object detection and tracking in a normal mode.

The processor 170 of the driver assistance apparatus 100 may combine preceding vehicle information, lane marker detection information, and road surface detection information based on stereo images, vehicle travel information, such as vehicle angle information and vehicle tilt information, from the ECU 770 or the sensor unit 760, and map information from the AVN apparatus 400 to calculate an attitude of the vehicle.

For example, in a case in which the vehicle angle information indicates that the vehicle does not tilt in a state in which the preceding vehicle and the lane marker are detected as tilting to the right based on the stereo images, the processor 170 of the driver assistance apparatus 100 may calculate that the real vehicle is traveling along a track curved to the right using the map information.

Consequently, it is possible to perform attitude control of the vehicle based on the stereo images, and the sensor information.

On the other hand, as an example of the attitude control of the vehicle, it is possible to calculate whether the vehicle has slipped and to perform slip prevention control. Calculation of whether the vehicle has slipped will hereinafter be described in detail with reference to FIGS. 13A and 13B.

During slip of the vehicle or when slip of the vehicle is predicted, the processor 170 of the driver assistance apparatus 100 may generate a slip prevention control signal to control at least one of the steering drive unit 752, the brake drive unit 753, the power source drive unit 754, and the suspension drive unit 756.

In a case in which the real vehicle is calculated as slipping to the left, the processor 170 of the driver assistance apparatus 100 may generate at least one of a steering drive control signal to move the vehicle to the right and a brake drive control signal.

The ECU 770 may receive at least one of the steering drive control signal and the brake drive control signal through the interface unit 130. The steering drive unit 752 may control the steering apparatus to perform steering to the right or the brake drive unit 753 may drive a left brake.

Consequently, it is possible to perform slip prevention control based on the stereo images, the sensor information, the map information, and the position information through the driver assistance apparatus 100.

Figure 13A:
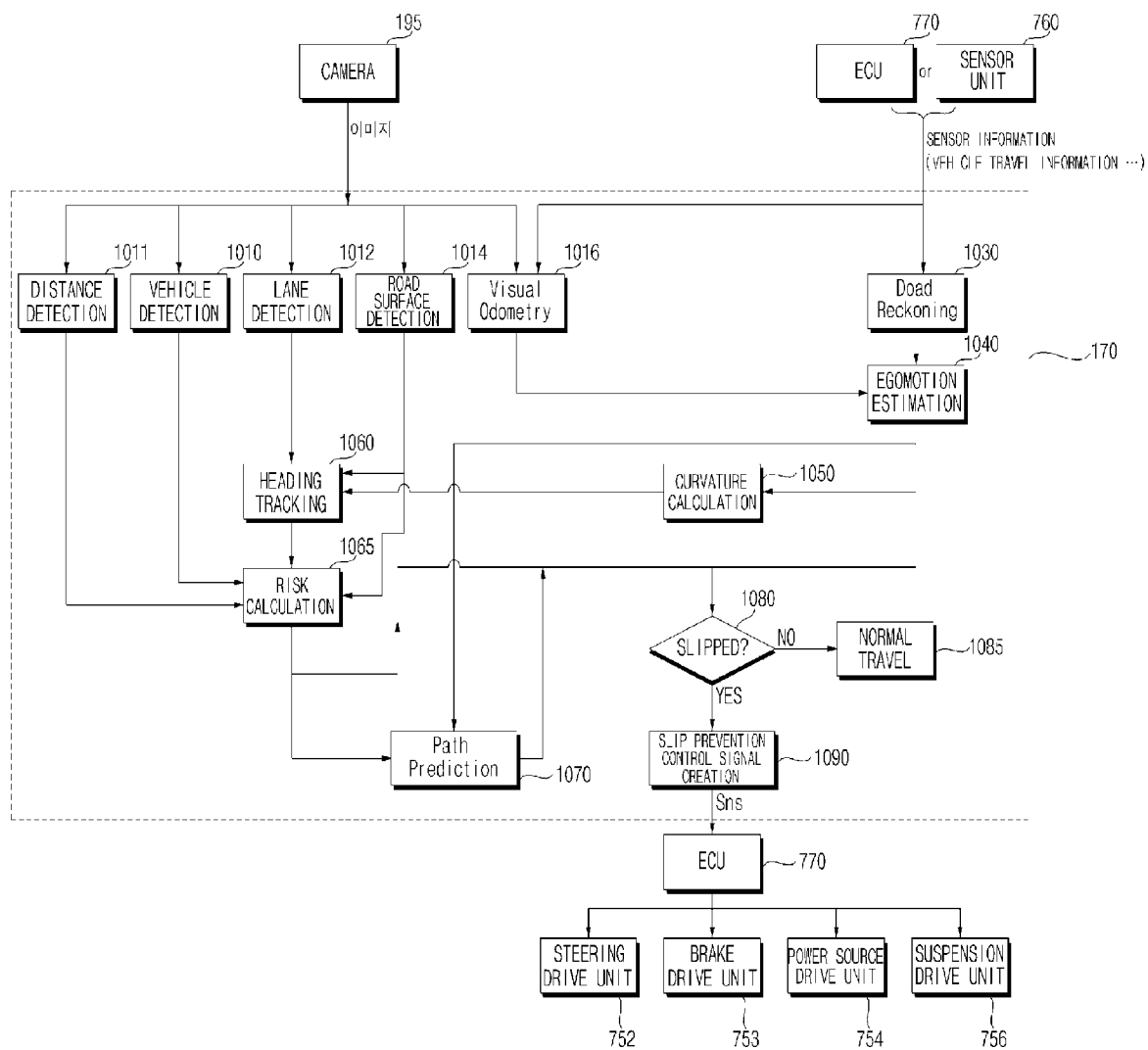
FIGS. 13A and 13B are reference views illustrating attitude control of the vehicle during slip of the vehicle.
Figure 13B:
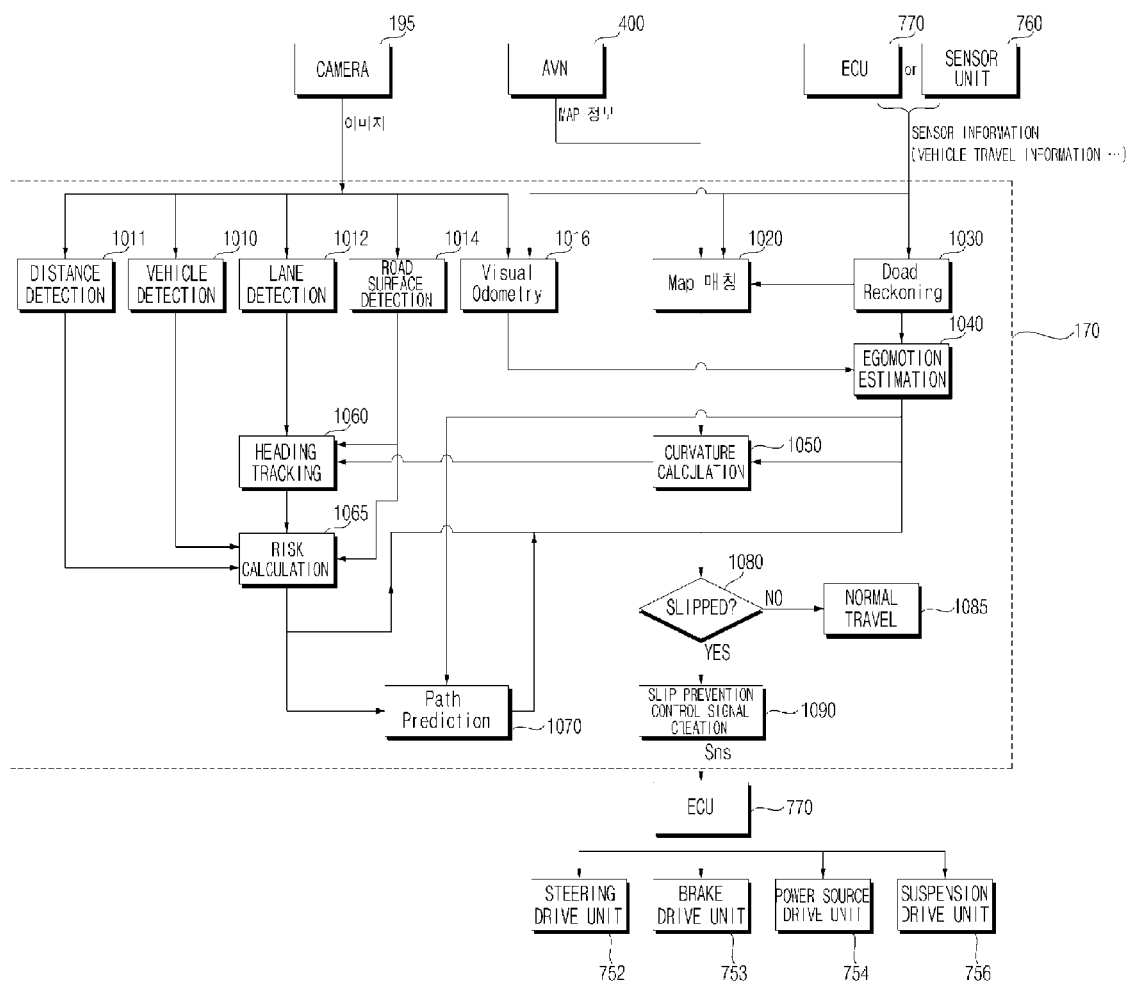
Figure 14:
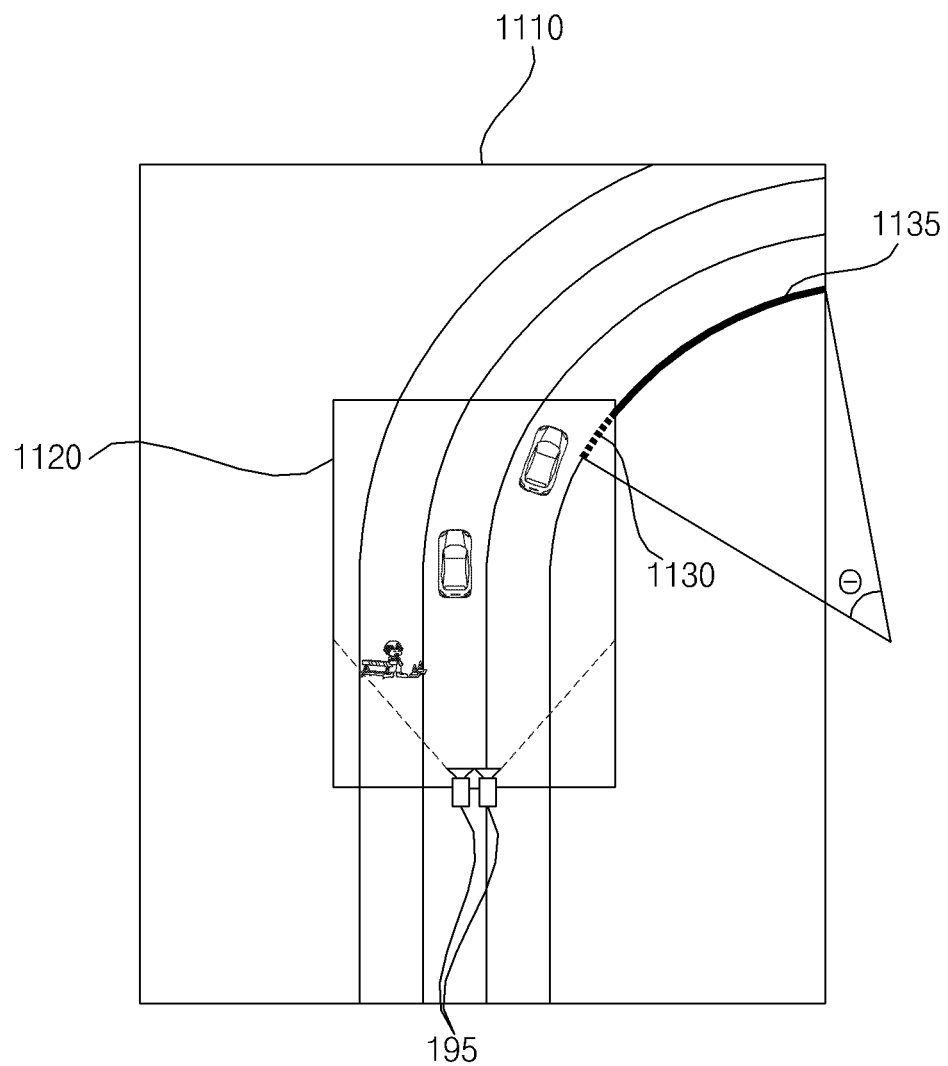
FIGS. 14 to 15B are reference views illustrating the attitude control of the vehicle in FIG. 13A or 13B.
Figure 15A:
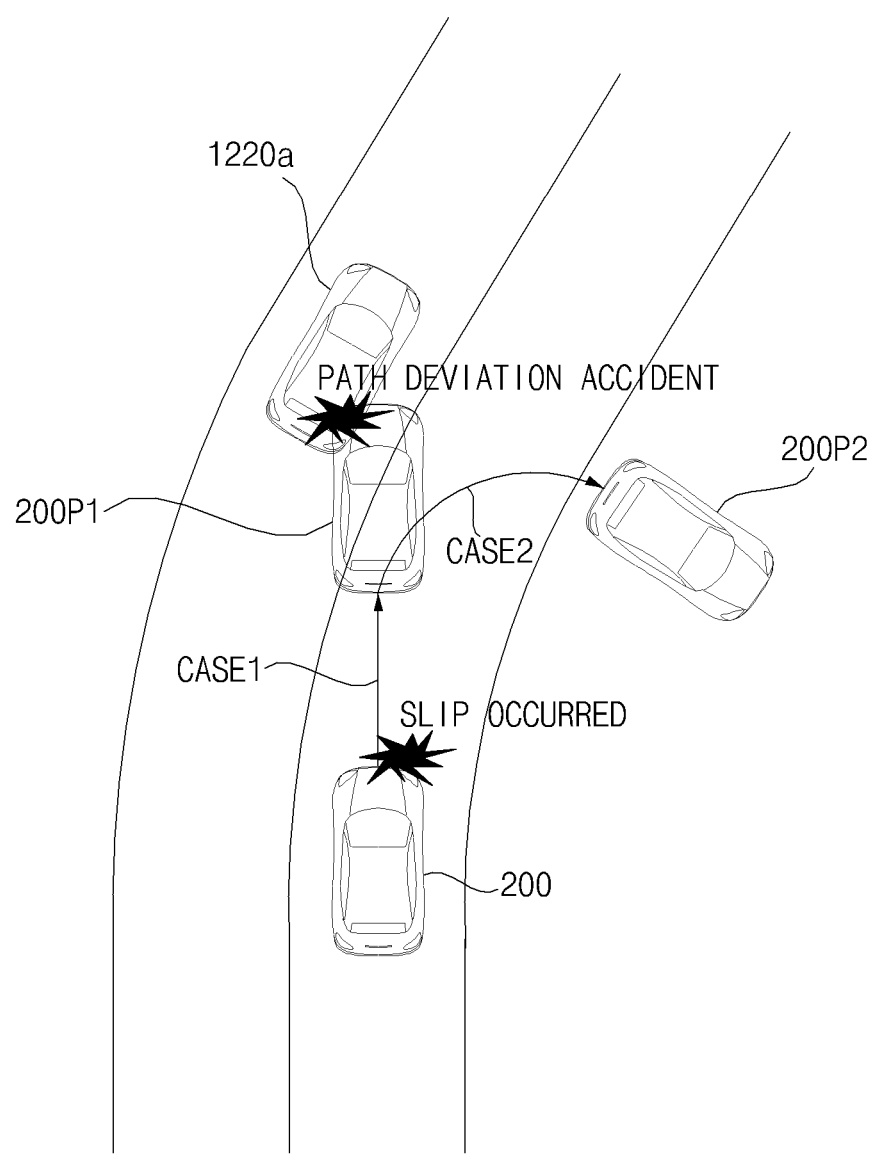
Figure 15B:
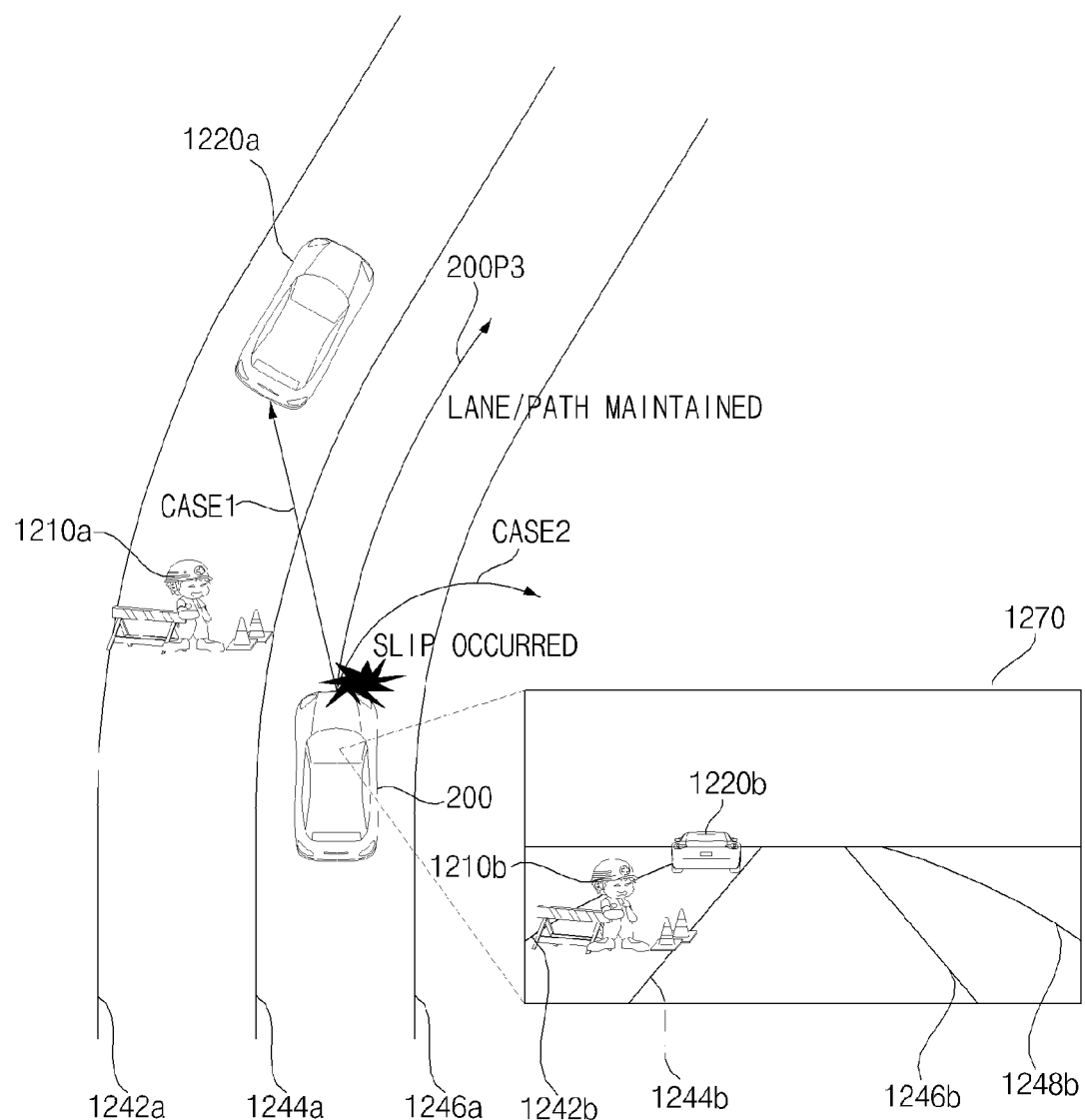

FIGS. 13A and 13B are reference views illustrating attitude control of the vehicle during slip of the vehicle and FIGS. 14 to 15B are reference views illustrating the attitude control of the vehicle in FIG. 13A or 13B.

Referring first to FIG. 13A, the processor 170 of the driver assistance apparatus 100 detects image-based vehicle surrounding information based on stereo images received from the stereo camera 195. The image-based vehicle surrounding information may include preceding vehicle information, lane marker information, road surface information, and traffic sign information.

As previously described, a disparity may be calculated based on the received stereo images and image segment, object detection, and object verification may be performed using the disparity information.

Consequently, the processor 170 of the driver assistance apparatus 100 may perform vehicle detection 1010, distance detection 1011, lane marker detection 1012, road surface detection 1014, and visual odometry 1016.

Subsequently, the processor 170 of the driver assistance apparatus 100 estimates vehicle motion based on the sensor information from the ECU 770 or the sensor unit 760. In particular, the processor 170 of the driver assistance apparatus 100 estimates vehicle egomotion, i.e., the environmental displacement of the vehicle, based on vehicle travel information of the sensor information.

The processor 170 of the driver assistance apparatus 100 performs a dead reckoning 1030 [This process requires a more specific disclosure to enable the invention, how does the dead reckoning get calculated] based on the vehicle travel information from the ECU 770 or the sensor unit 760.

Subsequently, the processor 170 of the driver assistance apparatus 100 performs egomotion estimation 1040 based on the dead reckoning. At this time, the egomotion estimation 1040 may be performed based on the visual odometry in addition to the dead reckoning.

Meanwhile, the processor 170 of the driver assistance apparatus 100 may perform a curvature calculation 1050 for a travel road based on the egomotion estimation 1040.

Subsequently, the processor 170 of the driver assistance apparatus 100 predicts a vehicle path based on the estimated egomotion.

The processor 170 of the driver assistance apparatus 100 performs vehicle heading tracking 1060 based on the curvature calculation 1050, the lane marker detection 1012, and the road surface detection 1014.

Subsequently, the processor 170 of the driver assistance apparatus 100 performs risk calculation 1065 for a rear-end collision risk based on the vehicle heading tracking 1060, the vehicle detection 1010, the distance detection 1011, and the road surface detection 1014.

Subsequently, the processor 170 of the driver assistance apparatus 100 performs vehicle path prediction 1070 based on the risk calculation 1065 and the egomotion estimation 1040. That is, the processor 170 of the driver assistance apparatus 100 predicts a vehicle path based on the estimated egomotion.

Subsequently, the processor 170 of the driver assistance apparatus 100 calculates whether the vehicle has slipped based on the estimated egomotion and the predicted vehicle path.

The processor 170 of the driver assistance apparatus 100 performs vehicle slip determination 1080 based on the vehicle path prediction 1070, the risk calculation 1065, and the egomotion estimation 1040. In a case in which the vehicle has not slipped, the processor 170 of the driver assistance apparatus 100 performs normal travel 1085. In a case in which the vehicle has slipped, on the other hand, the processor 170 of the driver assistance apparatus 100 performs slip prevention control signal creation 1090.

The generated slip prevention control signal Sns is transmitted to the ECU 770. The ECU 770 controls at least one of the steering drive unit 752, the brake drive unit 753, the power source drive unit 754, and the suspension drive unit 756.

For example, in a case in which the vehicle 200 has slipped to the left of the travel road, the steering drive unit 752 may control the steering apparatus to perform steering to the right based on the slip prevention control signal Sns or the brake drive unit 753 may drive the left brake.

In another example, in a case in which the vehicle 200 has slipped to the right of the travel road, the steering drive unit 752 may control the steering apparatus to perform steering to the left based on the slip prevention control signal Sns or the brake drive unit 753 may drive a right brake.

Consequently, it is possible to perform slip prevention control based on the stereo images, the sensor information, and the like through the driver assistance apparatus 100.

Referring now to FIG. 13B, FIG. 13B is different from FIG. 13A in that the processor 170 of the driver assistance apparatus 100 receives map information from the AVN apparatus 400 and further performs a map matching step and a vehicle heading tracking step. Hereinafter, only the difference therebetween will be described.

The processor 170 of the driver assistance apparatus 100 performs map matching based on the vehicle travel information of the sensor information from the ECU 770 or the sensor unit 760 and the map information from the AVN apparatus 400.

The processor 170 of the driver assistance apparatus 100 performs map matching 1020 of the vehicle on the map based on the vehicle position information (GPS information) of the vehicle travel information and the map information from the AVN apparatus 400. In addition, the processor 170 of the driver assistance apparatus 100 may change the current position of the vehicle on the map based on the vehicle travel information, e.g. the vehicle speed information.

The processor 170 of the driver assistance apparatus 100 may perform curvature calculation 1050 for a travel road based on the egomotion estimation 1040 and the map matching 1020.

FIG. 14 shows, by way of example, that image-based information 1120 and map information 1110 are combined to calculate a curvature of a travel road on which the vehicle travels.

In particular, the processor 170 of the driver assistance apparatus 100 may calculate a curvature 8 of a road ahead of the vehicle using detected lane marker information 1130 of the image-based information 1120 and lane marker information 1135 of the map information 1110 as shown in FIG. 14.

Subsequently, the processor 170 of the driver assistance apparatus 100 tracks a heading of the vehicle based on the map information and image-based vehicle surrounding information.

The processor 170 of the driver assistance apparatus 100 performs vehicle heading tracking 1060 based on the curvature calculation 1050 and the lane marker detection 1012.

The processor 170 of the driver assistance apparatus 100 performs the vehicle heading tracking 1060 based on the curvature calculation 1050, the lane marker detection 1012, and the road surface detection 1014.

Subsequently, the processor 170 of the driver assistance apparatus 100 predicts a vehicle path based on the estimated egomotion and the tracked heading.

The processor 170 of the driver assistance apparatus 100 performs risk calculation 1065 for a rear-end collision risk based on the vehicle heading tracking 1060, the vehicle detection 1010, the distance detection 1011, and the road surface detection 1014.

Subsequently, the processor 170 of the driver assistance apparatus 100 performs vehicle path prediction 1070 based on the risk calculation 1065 and the egomotion estimation 1040. That is, the processor 170 of the driver assistance apparatus 100 predicts a vehicle path based on the estimated egomotion and the tracked heading.

Subsequently, the processor 170 of the driver assistance apparatus 100 calculates whether the vehicle has slipped based on the estimated egomotion and the predicted vehicle path.

Consequently, it is possible to perform slip prevention control based on the stereo images, the sensor information, the map information, and the like through the driver assistance apparatus 100.

FIGS. 15A and 15B are reference views illustrating attitude control of the vehicle during slip of the vehicle.

By way of example, FIG. 15A shows two cases in which the vehicle 200 slips during travel (case 1 and case 2).

In a case in which the vehicle 200 which is traveling slips to the left on a curved road in a state in which another vehicle 1220a is located ahead of the vehicle 200 at the left side of the vehicle 200 (case 1), a slipped vehicle 200P1 may collide with the left preceding vehicle 1220a from behind.

On the other hand, in a case in which the vehicle 200 which is traveling slips to the right on the curved road (case 2), a slipped vehicle 200P2 may deviate from the road.

In the present disclosure, in order to prevent the vehicle from slipping as shown in FIG. 15A, vehicle attitude control, particularly slip prevention control, is performed based on the stereo images as previously described.

FIG. 15B is a reference view illustrating slip prevention control for case 1 and case 2.

FIG. 15B shows, by way of example, that a dangerous zone 1210 is located ahead of the vehicle 200 at the left side of the vehicle 200 and another vehicle 1220a is located in the dangerous zone 1210.

Meanwhile, an image 1270 shown in FIG. 15B may be an image acquired by the stereo camera. The processor 170 of the driver assistance apparatus 100 detects a dangerous zone 1210b, another vehicle 1220b, and lane markers 1242b, 1244b, 1246b, and 1248b based on the stereo image 1270.

The processor 170 of the driver assistance apparatus 100 predicts or calculates whether the vehicle has slipped as in case 1 and case 2 based on the stereo image, the sensor information, the map information, and the position information and performs slip prevention control when the vehicle has slipped.

For example, in a case in which the vehicle 200 slips to the left on the travel road as in case 1, the processor 170 of the driver assistance apparatus 100 generates a slip prevention control signal Sns such that the vehicle 200 keeps its own lane marker, particularly on a curved track, while not colliding with the preceding vehicle 1220a from behind. As a result, the steering drive unit 752 may control the steering apparatus to perform steering to the right or the brake drive unit 753 may drive the left brake.

On the other hand, in a case in which the vehicle 200 slips to the right on the travel road as in case 2, the processor 170 of the driver assistance apparatus 100 generates a slip prevention control signal Sns such that the vehicle 200 keeps its own lane marker, particularly on a curved track. As a result, the steering drive unit 752 may control the steering apparatus to perform steering to the left or the brake drive unit 753 may drive the right brake.

Consequently, it is possible to perform slip prevention control based on the stereo images, the sensor information, the map information, the position information, and the like through the driver assistance apparatus 100. In particular, it is possible to perform slip prevention control or slip prevention prediction control in consideration of preceding vehicle information, information regarding a dangerous zone ahead of the vehicle, and the like based on the stereo images in addition to the vehicle sensor information, thereby improving accuracy in the slip prevention control or the slip prevention prediction control.

Figure 16A:
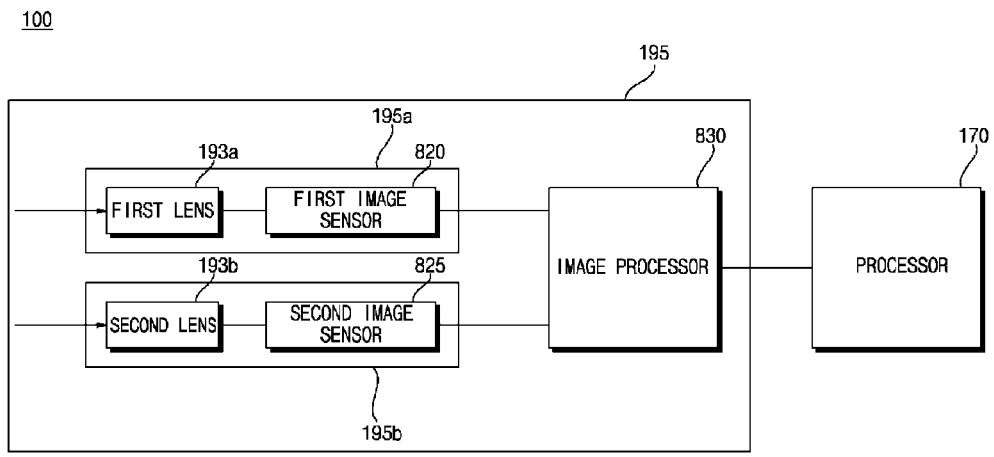
FIGS. 16A and 16B are internal block diagrams showing examples of the stereo camera shown in FIG. 2.
Figure 16B:
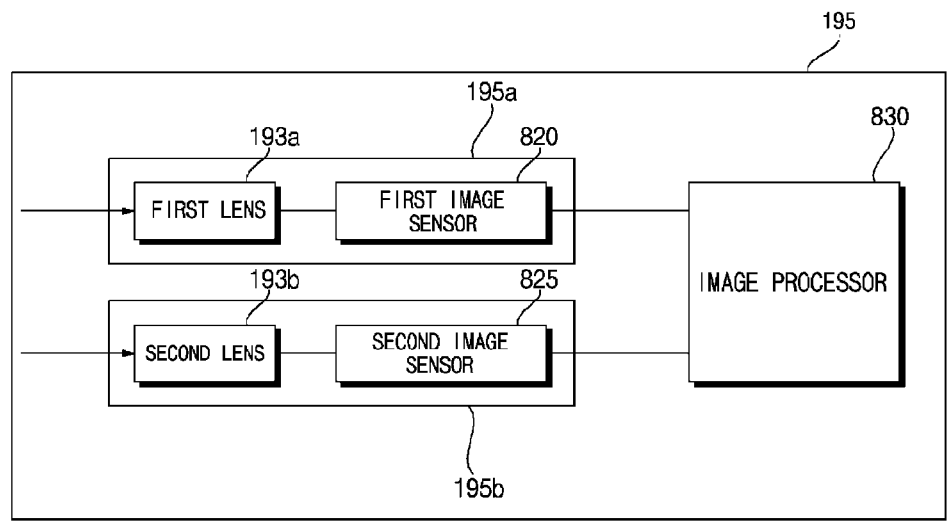

FIGS. 16A and 16B are internal block diagrams showing examples of the stereo camera shown in FIG. 2.

Referring first to FIG. 16A, the stereo camera 195 may include a first camera 195a, a second camera 195b, and an image processor 830. The driver assistance apparatus 100 (see FIG. 3) may include a processor 170 in addition to the image processor 830 as shown in FIG. 16A.

The first camera 195a may include a first lens 193a and a first image sensor 820. The second camera 195b may include a second lens 193b and a second image sensor 825. The first lens 193a and the second lens 193b may be spaced apart from each other by a distance of about 200 mm to 400 mm. The first image sensor 820 and the second image sensor 825 may acquire RGB images. The image processor 830 may generate and output a disparity map based on the RGB images from the first and second image sensors 820 and 825. In addition, the image processor 830 may generate and output an RGB image.

Meanwhile, the processor 170 of the driver assistance apparatus 100 (see FIG. 3) may receive a disparity map and an RGB image generated by the image processor 830 of the stereo camera 195 and may perform signal processing based thereupon.

For example, the processor 170 may detect an object for an RGB image ahead of the vehicle based on the disparity map and the RGB image and continuously track motion of the object after detection of the object. In addition, the processor 170 may calculate the distance to an adjacent vehicle, speed of the detected adjacent vehicle, and a difference in speed with the detected adjacent vehicle.

Alternatively, the processor 170 may generate and output a control signal for attitude control or travel control of the vehicle 200 based on the calculated speed of the adjacent vehicle and the calculated distance to the adjacent vehicle. For example, the processor 170 may generate a control signal to control at least one of the steering drive unit 752, the brake drive unit 753, the power source drive unit 754, and the suspension drive unit 756 in the vehicle.

Unlike the above description, on the other hand, the image processor 830 may further detect an object for an RGB image ahead of the vehicle based on the disparity map and the RGB image in addition to creation of the disparity map and continuously track motion of the object after detection of the object. In addition, the image processor 830 may calculate the distance to an adjacent vehicle, speed of the detected adjacent vehicle, and a difference in speed with the detected adjacent vehicle.

The processor 170 may receive information regarding the distance to the adjacent vehicle, information regarding the speed of the detected adjacent vehicle, and information regarding the difference in speed with the detected adjacent vehicle from the image processor 830 and may generate a control signal to control at least one of the steering drive unit 752, the brake drive unit 753, the power source drive unit 754, and the suspension drive unit 756 in the vehicle based thereupon.

Unlike the above description, on the other hand, the image processor 830 may generate a disparity map, detect an object, track motion of the object, calculate the distance to an adjacent vehicle, speed of the detected adjacent vehicle, and a difference in speed with the detected adjacent vehicle, and generate a control signal to control at least one of the steering drive unit 752, the brake drive unit 753, the power source drive unit 754, and the suspension drive unit 756 in the vehicle.

That is, as shown in FIG. 16B, the stereo camera 195 may include a first camera 195a, a second camera 195b, and an image processor 830. Alternatively, the driver assistance apparatus 100 (see FIG. 3) may not include a processor 170 as shown in FIG. 16A. Instead, the image processor 830 of the stereo camera 195 may perform all functions of the processor 170.

In this case, the stereo camera 195 of FIG. 16B may be identical to the driver assistance apparatus 100 (see FIG. 3) as described above.

The driver assistance apparatus according to the embodiment of the present disclosure and the vehicle including the same are not limited to the constructions and methods of the exemplary embodiments set forth herein. The exemplary embodiments may be selectively combined in part or in whole to form various embodiments.

The operation method of the driver assistance apparatus or the vehicle according to the present disclosure may be implemented as code that can be written on a processor-readable recording medium and thus read by a processor provided in the driver assistance apparatus or the vehicle. The processor-readable recording medium may be any type of recording device in which data is stored in a processor-readable manner. The processor-readable recording medium may include, for example, a read only memory (ROM), a random access memory (RAM), a compact disc read only memory (CD-ROM), a magnetic tape, a floppy disc, and an optical data storage device and may be implemented in the form of a carrier wave transmitted over the Internet. The processor-readable recording medium can be distributed over a plurality of computer systems connected to a network such that processor-readable code is written thereto and executed therefrom in a decentralized manner.

As is apparent from the above description, in a driver assistance apparatus according to an embodiment of the present disclosure and a vehicle including the same, it is possible to perform calibration based on first regions including objects for vehicle structures in stereo images acquired by a stereo camera in a calibration mode and to detect the distance to an object ahead of the vehicle based on second regions in the stereo images acquired by the stereo camera in a normal mode, thereby accurately performing distance detection based on the images photographed by the stereo camera.

On the other hand, in a driver assistance apparatus according to another embodiment of the present disclosure and a vehicle including the same, it is possible to perform calibration based on first regions including objects for structures outside a vehicle in stereo images acquired by a stereo camera in a calibration mode and to detect the distance to an object ahead of the vehicle based on second regions in the stereo images acquired by the stereo camera in a normal mode, thereby accurately performing distance detection based on the images photographed by the stereo camera.

In particular, when the position of the stereo camera is changed due to external impact, the images acquired by the stereo camera are calibrated through the calibration mode and, furthermore, the distance detection is accurately performed based on the calibrated stereo images, thereby improving accuracy of the driver assistance apparatus.

In addition, it is possible to generate a control signal to control at least one of a steering drive unit, a brake drive unit, a power source drive unit, and a suspension drive unit based on the distance detection, thereby performing vehicle control.

The calibration mode may be executed at the time of starting the vehicle, at the time of manipulating a predetermined user control, when external impact applied to the vehicle is equal to or greater than a predetermined level, or at the time of temporarily stopping the vehicle during travel of the vehicle, thereby improving user convenience.

On the other hand, an indicator indicating the calibration mode may be displayed or a sound indicating the calibration mode may be output such that a user can immediately recognize that calibration mode is being executed.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driver assistance apparatus comprising:
   a stereo camera to acquire stereo images; and
   a processor in communication with the stereo camera, the processor configured to perform calibration based on first regions of the stereo images, the first regions comprising one of vehicle structure objects or objects of structures external to a vehicle in a calibration mode and to detect a distance to an object ahead of the vehicle based on second regions not comprising one of the vehicle structure objects or the objects of structures external to a vehicle in a normal operational mode.

2. The driver assistance apparatus according to claim 1, wherein, in the calibration mode, the processor calculates a disparity between the first regions in the stereo images and compares the calculated disparity with a pre-stored reference disparity to calculate a calibration value.

3. The driver assistance apparatus according to claim 1, wherein, during execution of the normal mode and after completion of the calibration mode, the processor calibrates the second regions in the stereo images using the calibration value calculated in the calibration mode, performs disparity calculation based on the calibrated second regions in the stereo images, performs object detection and verification for the second regions based on disparity information by the disparity calculation, and detects a distance to the detected object.

4. The driver assistance apparatus according to claim 1, wherein the processor generates a control signal to control at least one of a steering drive unit, a brake drive unit, a power source drive unit, or a suspension drive unit in the vehicle based on the detected distance to the object ahead of the vehicle.

5. The driver assistance apparatus according to claim 1, wherein the vehicle structure is a portion of a body of the vehicle and comprises at least one of a character line, a hood emblem, and a hood edge line of the vehicle.

6. The driver assistance apparatus according to claim 1, wherein the structure outside the vehicle comprises at least one of a traffic sign, a signal light, and a streetlight.

7. The driver assistance apparatus according to claim 1, wherein the processor controls the calibration mode to be executed at the time of starting the vehicle, at the time of manipulating a user control, when external impact applied to the vehicle is equal to or greater than a predetermined level, or at the time of temporarily stopping the vehicle during travel of the vehicle.

8. The driver assistance apparatus according to claim 1, further comprising at least one selected from between:
   a display unit to display an indicator indicating the calibration mode during execution of the calibration mode; and
   an audio output unit to output a sound indicating the calibration mode during execution of the calibration mode.

9. The driver assistance apparatus according to claim 1, further comprising a display unit to display at least one of an indicator indicating a calibration range or a calibration value, information relating to progress time of the calibration mode, and information relating to remaining time of the calibration mode during execution of the calibration mode.

10. The driver assistance apparatus according to claim 3, further comprising:
an interface unit to receive sensor information of the vehicle, wherein if an error between the distance to the object detected based on the sensor information of the vehicle and the distance to the object detected based on the stereo images is equal to or greater than a predetermined value, the processor controls the calibration mode to be re-executed or the calibration value to be adjusted in the normal mode.

11. The driver assistance apparatus according to claim 10, further comprising at least one of a display unit and an audio output unit, and wherein if an error between the distance to the object detected based on the sensor information of the vehicle and the distance to the object detected based on the stereo images is equal to or greater than a predetermined value, the processor controls a notification message to be output through at least one selected from between the display unit and the audio output unit or releases control of the vehicle.

12. A vehicle comprising:
a steering drive unit to drive a steering apparatus;
a brake drive unit to drive a brake apparatus;
a power source drive unit to drive a power source;
a suspension drive unit to drive a suspension apparatus;
a stereo camera to acquire stereo images; and
a processor in communication with the stereo camera, the processor configured to perform calibration based on first regions of the stereo images, the first regions comprising one of vehicle structure objects or objects of structures external to a vehicle in a calibration mode and to detect a distance to an object ahead of the vehicle based on second regions not comprising one of the vehicle structure objects or the objects of structures external to a vehicle in a normal operational mode; and
a controller to generate a control signal to control at least one of the steering drive unit, the brake drive unit, the power source drive unit, and the suspension drive unit based on the detected distance to the object ahead of the vehicle.

13. The vehicle according to claim 12, wherein, in the calibration mode, the processor calculates a disparity between the first regions in the stereo images and compares the calculated disparity with a pre-stored reference disparity to calculate a calibration value.

14. The vehicle according to claim 12, wherein, during execution of the normal mode and after completion of the calibration mode, the processor calibrates the second regions in the stereo images using the calibration value calculated in the calibration mode, performs disparity calculation based on the calibrated second regions in the stereo images, performs object detection and verification for the second regions based on disparity information by the disparity calculation, and detects a distance to the detected object.

15. The vehicle according to claim 12, wherein the processor controls the calibration mode to be executed at the time of starting the vehicle, at the time of manipulating a user control, when external impact applied to the vehicle is equal to or greater than a predetermined level, or at the time of temporarily stopping the vehicle during travel of the vehicle.

16. The vehicle according to claim 12, further comprising a display unit to display at least one of an indicator indicating a calibration range or a calibration value, information regarding progress time of the calibration mode, or information relating to remaining time of the calibration mode during execution of the calibration mode.

17. The vehicle according to claim 14, further comprising:
an interface unit to receive sensor information of the vehicle, wherein if an error between the distance to the object detected based on the sensor information of the vehicle and the distance to the object detected based on the stereo images is equal to or greater than a predetermined value, the processor controls the calibration mode to be re-executed or the calibration value to be adjusted in the normal mode.

18. The vehicle according to claim 17, further comprising at least one selected from between a display unit and an audio output unit, and wherein if an error between the distance to the object detected based on the sensor information of the vehicle and the distance to the object detected based on the stereo images is equal to or greater than a predetermined value, the processor controls a notification message to be output through at least one of the display unit and the audio output unit or releases control of the vehicle.

19. The driver assistance apparatus according to claim 12, further comprising:
an interface unit to receive sensor information of the vehicle, wherein if an error between the distance to the object detected based on the sensor information of the vehicle and the distance to the object detected based on the stereo images is equal to or greater than a predetermined value, the processor controls the calibration mode to be re-executed or the calibration value to be adjusted in the normal mode.

\* \* \* \* \*